US012646322B2

(12) United States Patent
Liang

(10) Patent No.: US 12,646,322 B2
(45) Date of Patent: Jun. 2, 2026

(54) VIDEO-DRIVEN SPATIAL AUDIO ENHANCEMENT

(71) Applicant: Tencent Technology (Shenzhen) Company Limited, Shenzhen (CN)

(72) Inventor: Qireng Liang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 461 days.

(21) Appl. No.: 17/888,215

(22) Filed: Aug. 15, 2022

(65) Prior Publication Data

US 2022/0392224 A1     Dec. 8, 2022

Related U.S. Application Data

(63) Continuation of application No. PCT/CN2021/100306, filed on Jun. 16, 2021.

(30) Foreign Application Priority Data

Jul. 24, 2020     (CN) .......................... 202010724466.1

(51) Int. Cl.
*G06V 20/40*         (2022.01)
*G06T 7/194*         (2017.01)
*G06T 7/246*         (2017.01)

(52) U.S. Cl.
CPC .............. *G06V 20/46* (2022.01); *G06T 7/194* (2017.01); *G06T 7/246* (2017.01); *G06T 2207/10016* (2013.01)

(58) Field of Classification Search
CPC ......... G06V 20/46; G06T 7/194; G06T 7/246; G06T 2207/10016; H04N 21/23418;

(Continued)

(56) References Cited

U.S. PATENT DOCUMENTS 6,829,018 B2 * 12/2004 Lin ......................... H04S 5/005
                                                             348/515
9,113,280 B2 * 8/2015 Cho .......................... H04S 7/40

(Continued)

FOREIGN PATENT DOCUMENTS

CN     101390443 A     3/2009
CN     103702180 A     4/2014

(Continued)

OTHER PUBLICATIONS

International Search Report and Written Opinion issued Sep. 15, 2021 in International Application No. PCT/CN2021/100306 with English Translation (9 pages).

(Continued)

*Primary Examiner* — Henok Shiferaw
*Assistant Examiner* — Dion J Satcher
(74) *Attorney, Agent, or Firm* — ArentFox Schiff LLP

(57) ABSTRACT

A data processing method includes acquiring video frame data including one or more video frames and audio data of a video, and determining position attribute information of a target object in the acquired one or more video frames, the target object being associated with the audio data. The method also includes acquiring a channel encoding parameter associated with the position attribute information, and performing azimuth enhancement processing on the audio data according to the channel encoding parameter to obtain enhanced audio data. Apparatus and non-transitory computer-readable storage medium counterpart embodiments are also contemplated.

18 Claims, 14 Drawing Sheets

(58) Field of Classification Search
CPC .. H04N 21/222; H04N 21/233; H04N 21/439; H04N 21/44008; H04N 21/8106; G10L 21/0316; G10L 19/008; G10L 21/02; H04S 1/005; H04S 7/30; H04S 1/00
USPC ................................................ 382/103, 382
See application file for complete search history.

(56) References Cited

U.S. PATENT DOCUMENTS

| | | | | |
|---|---|---|---|---|
| 10,672,408 | B2 * | 6/2020 | Breebaart | G10L 19/008 |
| 11,184,579 | B2 * | 11/2021 | Honma | H04N 5/9202 |
| 2003/0053680 | A1 | 3/2003 | Lin et al. | |
| 2014/0032987 | A1 * | 1/2014 | Nagaraj | H04N 19/00 |
| | | | | 714/E11.131 |
| 2014/0180684 | A1 * | 6/2014 | Strub | H04S 3/002 |
| | | | | 704/211 |
| 2016/0125888 | A1 * | 5/2016 | Purnhagen | G10L 19/20 |
| | | | | 381/23 |
| 2016/0142847 | A1 * | 5/2016 | Disch | H04S 3/00 |
| | | | | 381/23 |
| 2017/0092280 | A1 * | 3/2017 | Hirabayashi | G10K 15/02 |
| 2017/0265016 | A1 * | 9/2017 | Oh | H04S 7/303 |
| 2017/0364752 | A1 * | 12/2017 | Zhou | G06V 10/462 |
| 2018/0233154 | A1 * | 8/2018 | Vaillancourt | G10L 19/002 |
| 2018/0374233 | A1 * | 12/2018 | Zhou | G06F 18/22 |
| 2019/0069110 | A1 * | 2/2019 | Gorzel | H04S 3/00 |
| 2019/0313200 | A1 * | 10/2019 | Stein | H04S 1/002 |
| 2020/0221230 | A1 * | 7/2020 | Fuchs | H04S 7/30 |
| 2020/0412772 | A1 * | 12/2020 | Nesta | G06F 3/165 |
| 2021/0021949 | A1 * | 1/2021 | Sridharan | H04R 5/04 |
| 2022/0279299 | A1 * | 9/2022 | Vasilache | G10L 19/008 |

FOREIGN PATENT DOCUMENTS

| | | |
|---|---|---|
| CN | 108847248 A | 11/2018 |
| CN | 109313904 A | 2/2019 |
| CN | 109640112 A | 4/2019 |
| CN | 110168638 A | 8/2019 |
| CN | 111050269 A | 4/2020 |
| CN | 111669696 A | 9/2020 |
| CN | 111885414 A | 11/2020 |
| JP | 2014195267 A | 10/2014 |

OTHER PUBLICATIONS

Chinese Office Action issued Mar. 1, 2021 in International Application No. 202010724466.1 with Concise English Translation (9 pages).
Chinese Office Action issued Sep. 1, 2021 in International Application No. 202010724466.1 with Concise English Translation (10 pages).
Supplementary European Search Report issued Apr. 17, 2023 in Application No. 21846310.7 (8 pages).

* cited by examiner

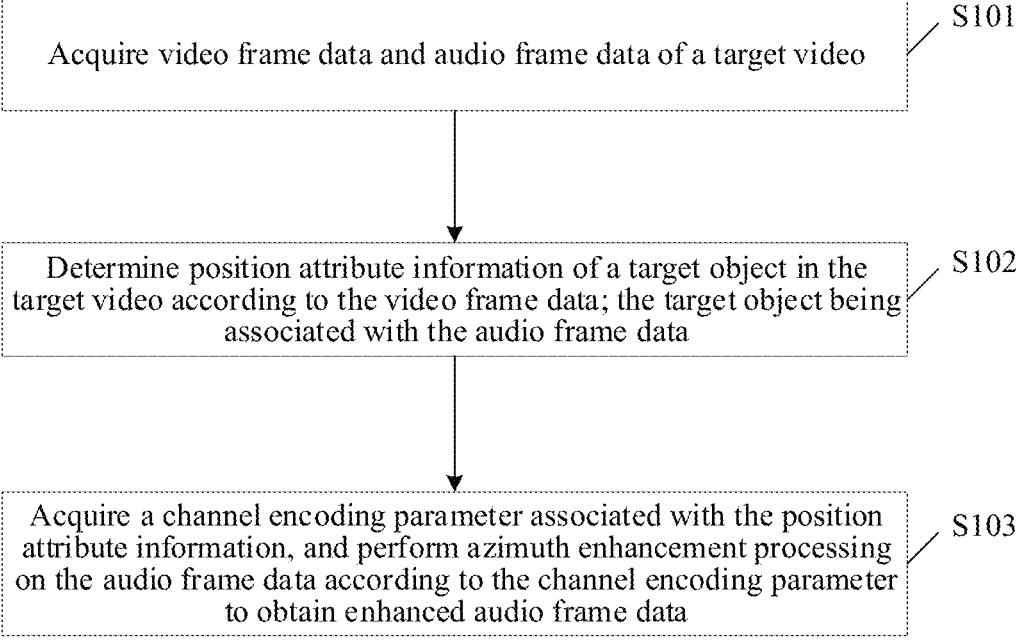

Acquire video frame data and audio frame data of a target video                          S101

Determine position attribute information of a target object in the target video according to the video frame data; the target object being associated with the audio frame data                          S102

Acquire a channel encoding parameter associated with the position attribute information, and perform azimuth enhancement processing on the audio frame data according to the channel encoding parameter to obtain enhanced audio frame data                          S103

FIG. 3

Video frame a     Video frame b     Video frame c     Video frame d     Video frame e     Video frame f Input Object identification model Determine Video frame b     Video frame c     Video frame d     Video frame e     Video frame f The lip changes Video frame b     Video frame c     Video frame d     Video frame e Position coordinate     Position coordinate     Position coordinate     Position coordinate

VIDEO-DRIVEN SPATIAL AUDIO ENHANCEMENT

RELATED APPLICATION

This application is a continuation of International Application No. PCT/CN2021/100306, filed on Jun. 16, 2021, which claims priority to Chinese Patent Application No. 202010724466.1, entitled "DATA PROCESSING METHOD AND APPARATUS, DEVICE, AND READABLE STORAGE MEDIUM," filed on Jul. 24, 2020. The entire disclosures of the prior applications are hereby incorporated by reference in their entirety.

FIELD OF THE TECHNOLOGY

This disclosure relates to the technical field of computers, including a data processing method and apparatus, a device, and a readable storage medium.

BACKGROUND OF THE DISCLOSURE

With the development of multimedia technologies, videos have become main carriers for people to acquire information and enjoy entertainment in daily life. Due to popularity of mobile devices, current users have gradually relied on the mobile devices to watch videos, and requirements for video playback have gradually increased when the users watch the videos on the mobile devices. During video playback, how to optimize the video and audio playback has become important.

In the related art, after an audio optimization manner is selected for a process of video and audio optimization, identical audio optimization parameters are used for different styles of video and audio. Visualization of video scenarios is not taken into account in the manner. For example, for quiet scenarios and scenarios with intense actions, identical optimization parameters are used for optimization in current optimization manners. In this way, without consideration of video scenarios, it is difficult to ensure that identical optimization parameters are applicable to all styles of video scenarios, thereby reducing an audio optimization effect and affecting users' video perception.

SUMMARY

Embodiments of this disclosure provide a data processing method and apparatus, and a non-transitory computer-readable storage medium, which can improve audio optimization effects in videos.

In an embodiment, data processing method includes acquiring video frame data including one or more video frames and audio data of a video, and determining position attribute information of a target object in the acquired one or more video frames, the target object being associated with the audio data. The method also includes acquiring a channel encoding parameter associated with the position attribute information, and performing azimuth enhancement processing on the audio data according to the channel encoding parameter to obtain enhanced audio data.

In an embodiment, a data processing apparatus includes processing circuitry configured to acquire video frame data including one or more video frames and audio data of a video, and determine position attribute information of a target object in the acquired one or more video frames, the target object being associated with the audio data. The processing circuitry is further configured to acquire a channel encoding parameter associated with the position attribute information, and perform azimuth enhancement processing on the audio data according to the channel encoding parameter to obtain enhanced audio data.

In an embodiment, a non-transitory computer-readable storage medium stores computer-readable instructions thereon, which, when executed by a computer, cause the computer to perform a data processing method. The data processing method includes acquiring video frame data including one or more video frames and audio data of a video, and determining position attribute information of a target object in the acquired one or more video frames, the target object being associated with the audio data. The data processing method further includes acquiring a channel encoding parameter associated with the position attribute information, and performing azimuth enhancement processing on the audio data according to the channel encoding parameter to obtain enhanced audio data.

In embodiments of this disclosure, after the video frame data and the audio frame data of the target video are acquired, the position attribute information of the target object in the target video in the video frame data can be identified, and then azimuth enhancement processing can be performed on the audio frame data of the target object through a channel encoding parameter associated with the position attribute information to obtain the enhanced audio frame data. It is to be understood that the channel encoding parameters for performing azimuth enhancement processing on the audio frame data in this disclosure are all associated with the position attribute information. Different position attribute information may be associated with different channel encoding parameters. In other words, in this disclosure, different channel encoding parameters can be provided through the position attribute information of the target object, and the audio frame data can be dynamically optimized according to the different channel encoding parameters, so that audio has a sense of spatial movement as the position changes, and an audio optimization effect is improved. Then, when a user plays back the video frame data, sound of the target object is the optimized enhanced audio data with the sense of spatial movement, which can bring the user good video perception.

BRIEF DESCRIPTION OF THE DRAWINGS

To describe the technical solutions in the embodiments of the present disclosure, the following briefly describes the accompanying drawings describing the embodiments. The accompanying drawings in the following description show only some embodiments of the present disclosure, and a person of ordinary skill in the art may derive other drawings from these accompanying drawings.

FIG. 3 is a schematic flowchart of a data processing method according to an embodiment of this disclosure.

DESCRIPTION OF EMBODIMENTS

Figure 1:
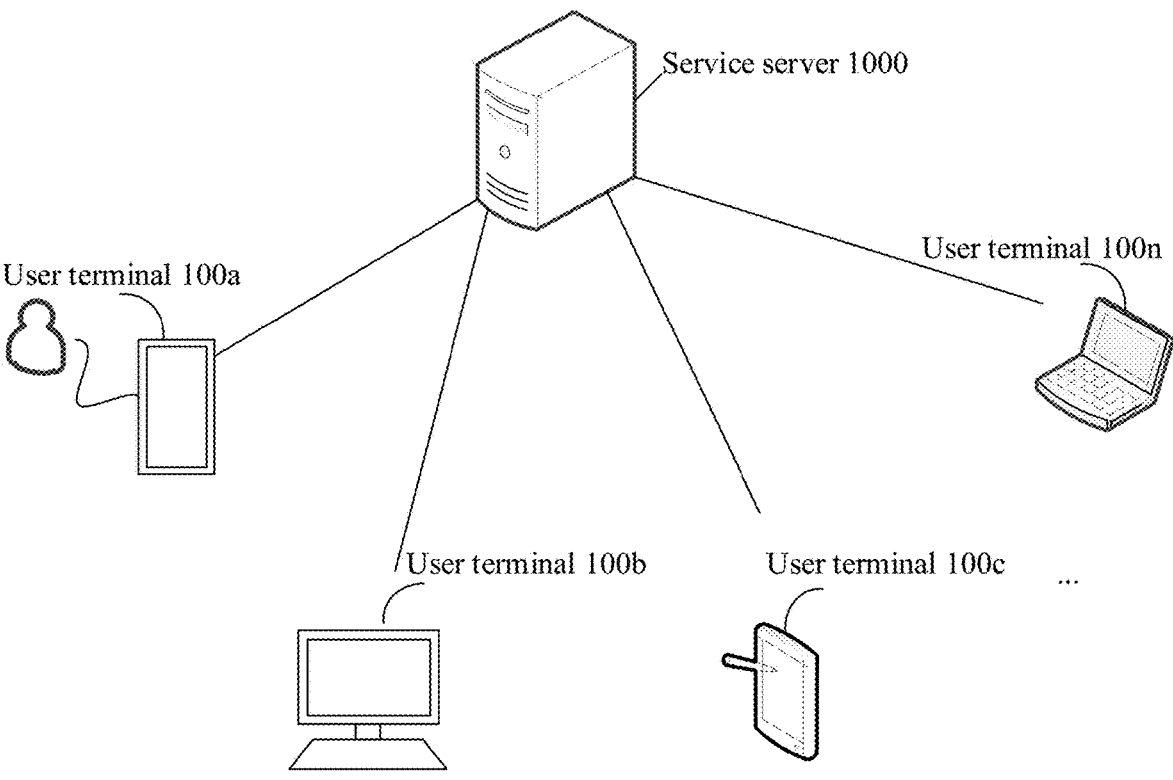
FIG. 1 is a schematic structural diagram of a network architecture according to an embodiment of this disclosure.

The technical solutions in embodiments of this disclosure are described in the following with reference to the accompanying drawings in the embodiments of this disclosure. The embodiments to be described are merely some rather than all of the embodiments of this disclosure. All other embodiments obtained by a person of ordinary skill in the art based on the embodiments of this disclosure shall fall within the protection scope of this disclosure.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology of computer sciences, attempts to understand essence of intelligence, and produces a new intelligent machine that can react in a manner similar to human intelligence. AI is to study design principles and implementation methods of various intelligent machines, to enable the machines to have functions of perception, reasoning, and decision-making.

AI technology is a comprehensive discipline and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing (NLP) technology, and machine learning (ML)/deep learning (DL).

The solutions according to the embodiments of this disclosure belong to computer vision (CV) and machine learning (ML) under the field of artificial intelligence.

Computer vision (CV) is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific subject, the CV studies related theories and technologies and attempts to establish an artificial intelligence (AI) system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

Machine learning (ML) is a multi-field interdiscipline, and relates to a plurality of disciplines such as probability theory, statistics, approximation theory, convex analysis, and algorithm complexity theory. ML specializes in studying how a computer simulates or implements a human learning behavior to acquire new knowledge or skills, and reorganize an existing knowledge structure, so as to keep improving its performance. The ML, as the core of AI, is a basic way to make the computer intelligent, and is applicable to various fields of AI. The ML and DL generally include technologies such as an artificial neural network, a belief network, reinforcement learning, transfer learning, inductive learning, and learning from demonstrations.

FIG. 1 is a schematic structural diagram of a network architecture according to an embodiment of this disclosure. As shown in FIG. 1, the network architecture may include a service server 1000 and a user terminal cluster. The user terminal cluster may include one or more user terminals. A quantity of the user terminals is not limited here. As shown in FIG. 1, the user terminals may include a user terminal 100a, a user terminal 100b, a user terminal 100c, . . . , and a user terminal 100n. As shown in FIG. 1, the user terminal 100a, the user terminal 100b, the user terminal 100c, . . . , and the user terminal 100n may be respectively connected to the service server 1000 over networks, so that each user terminal can exchange data with the service server 1000 through the network connection.

It may be understood that a target application may be installed in each user terminal as shown in FIG. 1. The target application, when running in each user terminal, may exchange data with the service server 1000 shown in FIG. 1, so that the service server 1000 can receive service data from the user terminal. The target application may include applications with functions of displaying data information such as text, images, audio, and videos. For example, the application may be a video player application. The video player application can be used for users to watch videos. The service server 1000 in this disclosure may collect service data from the applications. For example, the service data may be target videos watched by the users. Then, the service server 1000 may perform azimuth enhancement processing (optimization processing) on audio data in the service data (target videos) to obtain enhanced audio data. Further, the service server 1000 may transmit the enhanced audio data to a user terminal. Then, when a user plays back and watches the target video through the user terminal, audio that is heard has a sense of azimuth and space, and the user can be more immersed in a scenario of the target video. In the embodiment of this disclosure, one of the user terminals may be selected as a target user terminal. The user terminal may include: smart terminals with multimedia data processing functions (e.g., a video data playback function and a music data playback function) such as smart phones, tablet computers, laptop computers, desktop computers, smart TVs, smart speakers, desk computers, and smart watches, but is not limited thereto. For example, in the embodiment of this disclosure, the user terminal 100a shown in FIG. 1 may be used as the target user terminal. The above target application may be integrated into the target user terminal. In this case, the target user terminal may exchange data with the service server 1000 through the target application.

For example, when a user uses a target application (e.g., a video player application) in a user terminal, the service server 1000 detects and collects, through the target application in the user terminal, that a video played back by the user is a video A, the service server 1000 may acquire position attribute information of a sounding object (sound-emitting object or target object) in the video A and acquire a channel encoding parameter according to the position attribute information. The service server 1000 may perform azimuth enhancement processing on audio data of the video A according to the channel encoding parameter, so as to obtain an enhanced audio, and output the enhanced audio through a sound output channel of the user terminal. Therefore, when the user watches the video A, an audio heard is the enhanced audio, so that the user can have a sense of space and azimuth in hearing, thereby increasing the user's sense of immersion in the scenario.

In one implementation, it may be understood that the network architecture may include a plurality of service servers. One user terminal may be connected to one service server. Each service server may detect and collect service data (e.g., target videos played back by the user) in the user terminal connected thereto, and perform azimuth enhancement processing on audio data in the service data (target videos) to obtain enhanced audio data.

In one implementation, it may be understood that, when a user plays back a target video through a user terminal, the user terminal may acquire video frame data and audio frame data (or audio data) of the target video, and the user terminal may send the video frame data and the audio frame data to the service server 1000. The video frame data may include one or more video frames. The service server 1000 may perform azimuth enhancement processing on the audio frame data to obtain enhanced audio frame data, and associatively store the video frame data and the enhanced audio frame data. When the user plays back the target video again through the server terminal, the user terminal may acquire, from the service server 1000, the video frame data and the enhanced audio frame data that are associated, and output the video frame data and the enhanced audio frame data, and the user may watch the video frame data and hear the enhanced audio frame data through the user terminal.

It may be understood that the method according to the embodiment of this disclosure may be performed by a computer device. The computer device includes, but is not limited to, a user terminal or a service server. The service server may be a stand-alone physical server, or may be a server cluster or distributed system formed by a plurality of physical servers, or may be a cloud server that provides basic cloud computing services such as a cloud service, a cloud database, cloud computing, a cloud function, cloud storage, a network service, cloud communications, a middleware service, a domain name service, a security service, a content delivery network (CDN), and a big data and artificial intelligence platform.

The user terminal and the service server may be directly or indirectly connected in a wired or wireless communication manner. This is not limited in this disclosure.

Figure 2A:
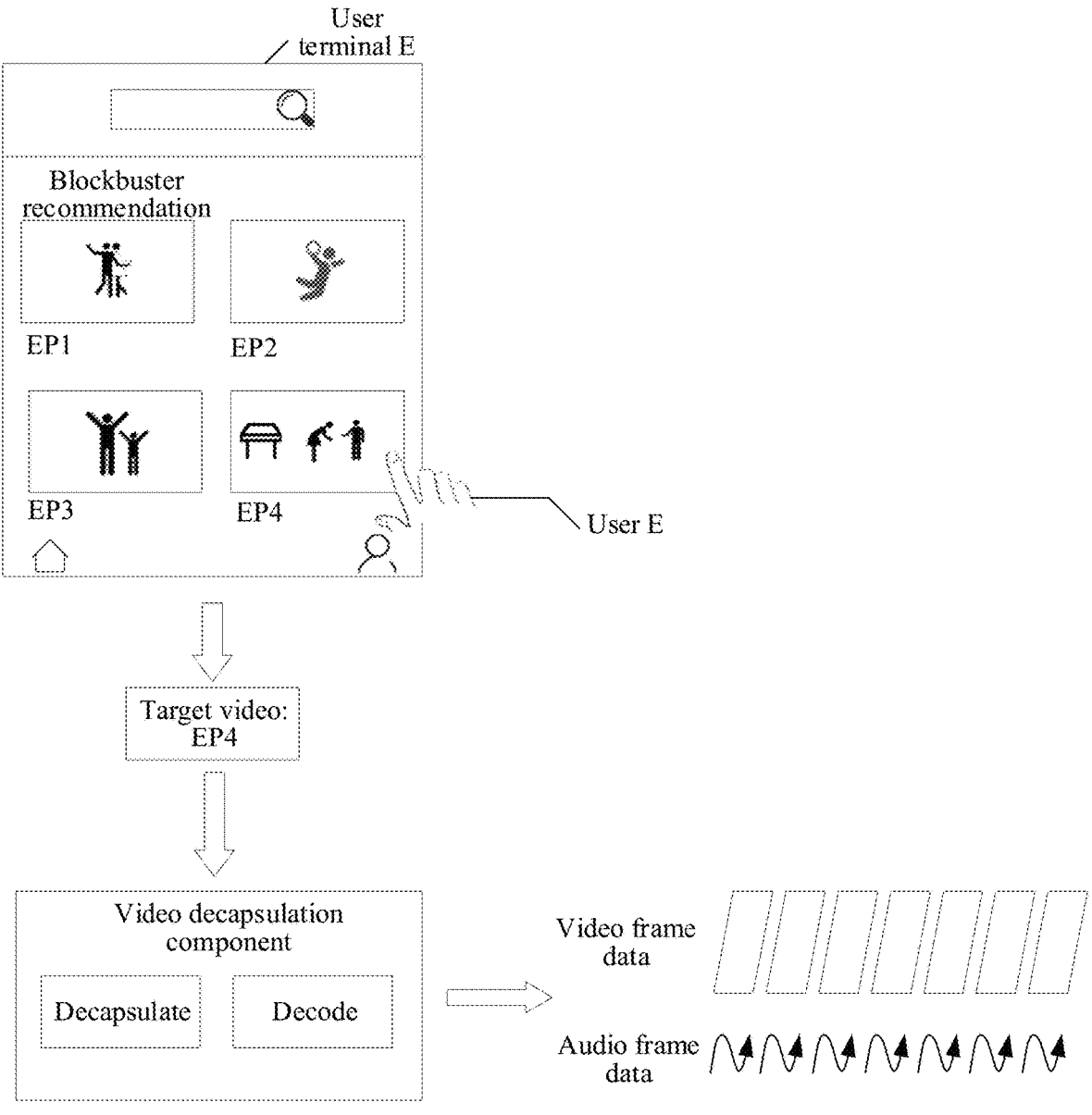
FIG. 2a is a schematic diagram of acquisition of video frame data and audio frame data according to an embodiment of this disclosure.

For ease of understanding, FIG. 2a is a schematic diagram of acquisition of video frame data and audio frame data according to an embodiment of this disclosure. A user terminal E as shown in FIG. 2a may be any user terminal selected from the user terminal cluster in the embodiment corresponding to FIG. 1. For example, the user terminal may be the user terminal 100b.

As shown in FIG. 2a, a user E may be a target user. The user E selects a video EP4 from a video player application of a user terminal E for watching. The user terminal E uses the video EP4 selected by the user E as a target video, and inputs the target video EP4 into a video decapsulation component. The target video may be decapsulated by the video decapsulation component, so as to obtain pure video stream data and pure audio stream data. Then, the pure video stream data can be decoded in the video decapsulation component to obtain the video frame data. The pure audio stream data may also be decoded to obtain the audio frame data.

Figure 2B:
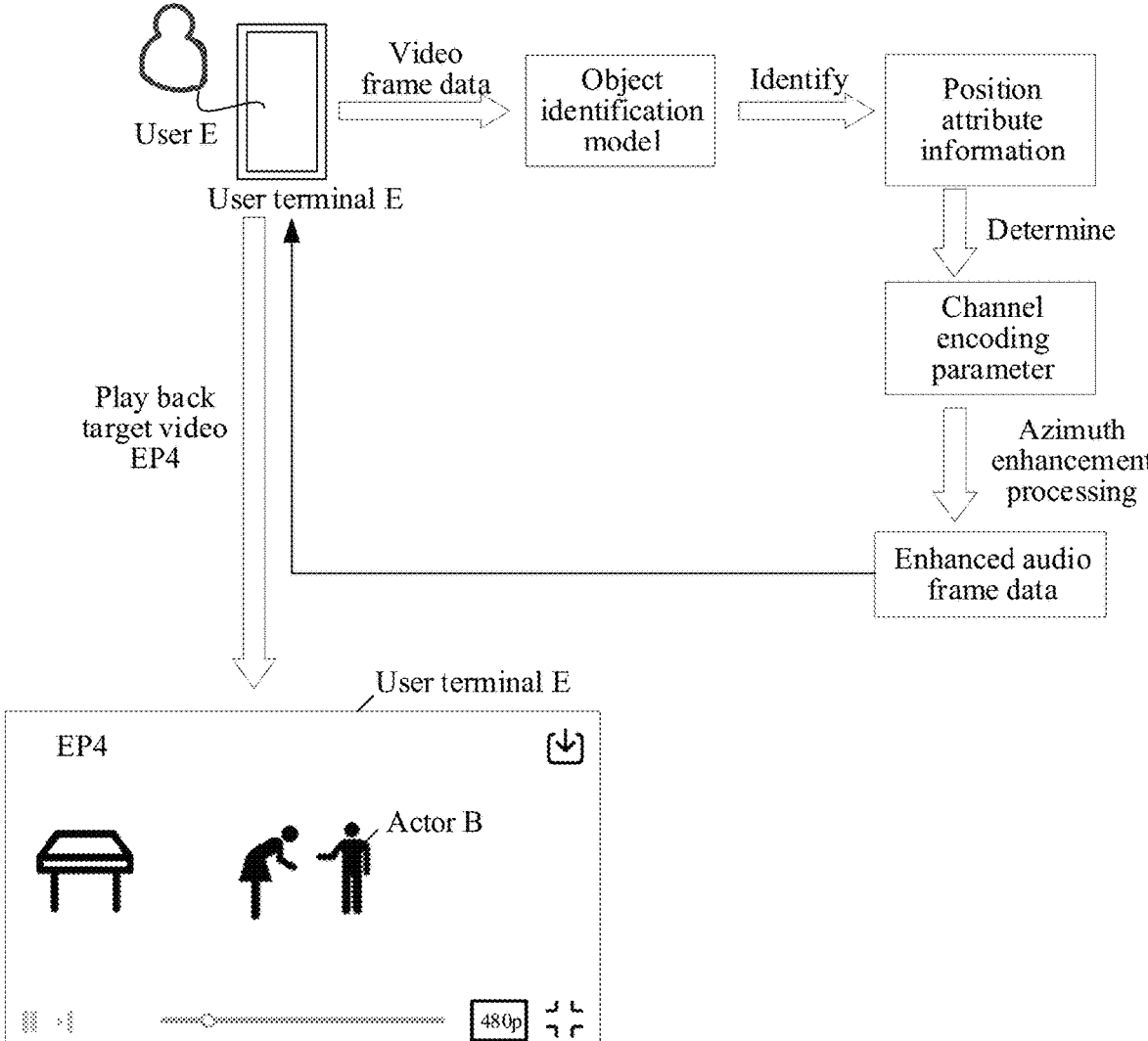
FIG. 2b is a schematic diagram of a scenario according to an embodiment of this disclosure.

For ease of understanding, FIG. 2b is a schematic diagram of a scenario according to an embodiment of this disclosure. The user terminal E as shown in FIG. 2b may be any user terminal selected from the user terminal cluster in the embodiment corresponding to FIG. 1. For example, the user terminal may be the user terminal 100b.

As shown in FIG. 2b, the user terminal E may input the video frame data of the target video EP4 (including one or more video frames of the video frame data) obtained through the video decapsulation component in the embodiment corresponding to FIG. 2a into an object identification model, and a sounding object (i.e., a target object or a sound-emitting object) in the target video EP4 can be identified by the object identification model. As shown in FIG. 2b, in the target video EP4, the sounding object is an actor B, and the actor B may be taken as the target object. Then, it can be seen that the audio frame data corresponding to the target video EP4 includes an audio of the target object B. Then, the object identification model may identify position attribute information of the target object in the target video EP4. Then, the user terminal E may acquire a channel encoding parameter associated with the position attribute information, and perform azimuth enhancement processing on the audio frame data in the target video EP4 according to the channel encoding parameter to obtain enhanced audio frame data. Then, the user terminal E may output the video frame data and the enhanced audio frame data of the target video EP4, and the user E may watch the target video EP4 and hear the enhanced audio frame data through the user terminal E.

Further, FIG. 3 is a schematic flowchart of a data processing method according to an embodiment of this disclosure. The method may be performed by a user terminal (e.g., the user terminal as shown in FIG. 1, FIG. 2a, and FIG. 2b) or a service server (e.g., the service server 1000 shown in FIG. 1), or performed by both a user terminal and a service server (e.g., the service server 1000 in the embodiment corresponding to FIG. 1). For ease of understanding, this embodiment is described with an example in which the method is performed by the above user terminal. The data processing method may include at least the following steps S101 to S103.

In step S101, video frame data and audio frame data (audio data) of a video are acquired.

In this disclosure, since the target video is generally a video in a video encapsulation format (such as an MP4 format, a is format, or an mkv format), there is a need to decapsulate the target video to obtain video stream data and audio stream data. For the decapsulation of the target video, the target video may be inputted into a video decapsulation component. The target video may be decapsulated by the video decapsulation component, so as to obtain video stream data and audio stream data. Then, the video stream data and the audio stream data may be respectively decoded in the video decapsulation component, so as to obtain video frame data corresponding to the video stream data and audio frame data corresponding to the audio stream data. The video decapsulation component here may be an ffmpeg tool or another third-party software tool with a video decapsulation capability. The video decapsulation components may not be illustrated one by one here.

In step S102, position attribute information of a target object in the target video is determined according to the video frame data. The target object is associated with the audio frame data.

In this disclosure, the video frame data here may include M video frames, M being an integer greater than 1. The target object here may refer to an object included in the target video. For example, the object may refer to a person or an animal, or refer to an aircraft, a helicopter, a vehicle, or the like. A specific method for determining the position attribute information of the target object according to the video frame data may involve inputting the video frame data to an object identification model. The position attribute information of the target object in the target video can be identified by the object identification model.

The object identification model here may include a lip motion detection component and a moving object identification component. The lip motion detection component may include a lip motion detection network. Position coordinate information of a target object in a rest state in the target video may be identified by the lip motion detection network. A specific method may involve inputting the video frame data into the object identification model. In the object identification model, N pieces of continuous video frame data can be acquired by the lip motion detection component. The N pieces of continuous video frame data here refers to video frame data with continuous timestamps. Each of the N pieces of continuous video frame data includes the target object. N is a positive integer less than or equal to M. Then, in the N pieces of continuous video frame data, the lip motion detection component may identify video frame data in which a sound-emitting part (such as a lip) of the target object changes, and take the video frame data as changed video frame data. Then, the lip motion detection component may determine position coordinate information of the target object in each piece of the changed video frame data.

Figures 4A, 4B:
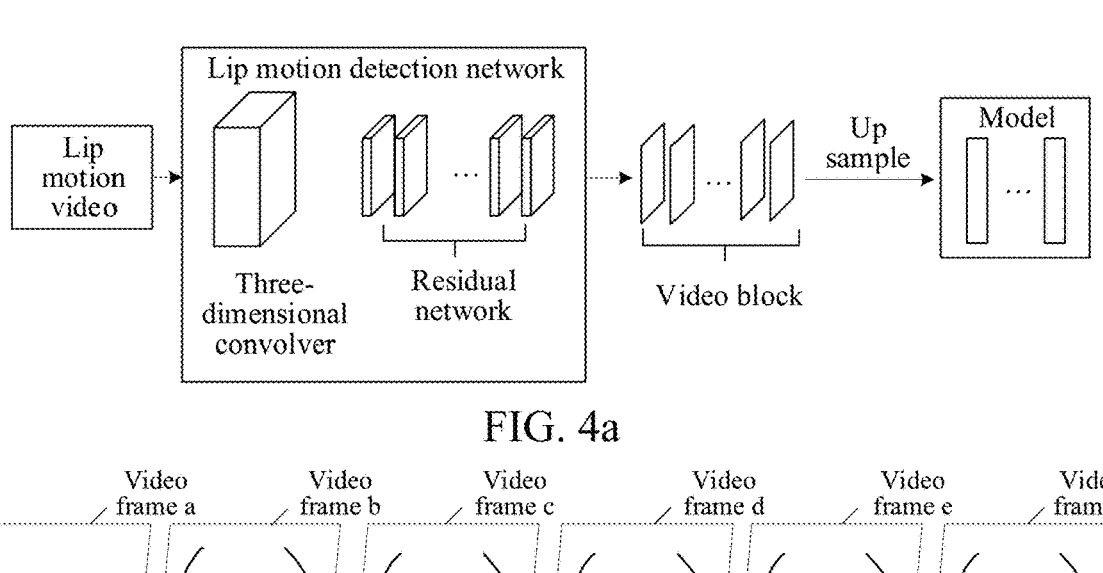
FIG. 4a is a schematic structural diagram of a lip motion detection component according to an embodiment of this disclosure.
FIG. 4b is a schematic diagram of determination of a position coordinate of a target object according to an embodiment of this disclosure.

For ease of understanding, FIG. 4a is a schematic structural diagram of a lip motion detection component according to an embodiment of this disclosure. As shown in FIG. 4a, a three-dimensional convolver (Conv3d) and a residual network (e.g., a Resnet 18 residual network) may form the lip motion detection network. In this embodiment, the residual network includes 17 convolution layers and 1 fully connected layer. A large number of sample lip motion videos may be inputted to the three-dimensional convolver and the residual network to train the lip motion detection network, so that feature data and a model of the lip motion detection network (such as model lip embeddings) can be obtained. Then, when the target video is inputted to the model, the model can identify video frames, which include motion of the lip of the target object, in the target video, and determine, according to timestamps respectively corresponding to the video frames in which the lip changes, a start time and an end time of the motion of the lip of the target object. Moreover, the model may determine position coordinate information of the target object in each video frame image. It is to be noted that, since the target object here is in a rest state in the target video and does not move, the position coordinate of the target object in each video frame may be basically the same.

Further, for ease of understanding, FIG. 4b is a schematic diagram of determination of a position coordinate of a target object according to an embodiment of this disclosure. As shown in FIG. 4b, a video frame a, a video frame b, a video frame c, a video frame d, a video frame e, and a video frame f are video frame data of a target video A. The video frame a, the video frame b, the video frame c, the video frame d, the video frame e, and the video frame f are time-continuous video frames. That is, a timestamp of the video frame a is less than that of the video frame b, the timestamp of the video frame b is less than that of the video frame c, the timestamp of the video frame c is less than that of the video frame d, the timestamp of the video frame d is less than that of the video frame e, and the timestamp of the video frame e is less than that of the video frame f. The video frame data including the video frame a, the video frame b, the video frame c, the video frame d, the video frame e, and the video frame f is inputted to the object identification model. It can be determined, through the lip motion detection component in the object identification model, that the continuous video frames, i.e., the video frame b, the video frame c, the video frame d, the video frame e, and the video frame f, all include the same target object. Then, the lip motion detection component may discard the video frame a and extract the continuous video frames including the same target object.

Then, in the lip motion detection component, video frames in which the lip changes can be identified from the continuous video frames including the same target object as changed video frames. As shown in FIG. 4b, in the continuous video frames, the lip in the video frame b is in a closed state, while the lip in the video frame c is in a slightly open state, from which it can be determined that the lip from the video frame b to the video frame c changes, so the video frame b and the video frame c can be determined as changed video frame. Similarly, the lip from the video frame c to the video frame d also changes (from the slightly open state to a laughing state), so the video frame d can also be determined as a changed video frame. Similarly, the lip from the video frame d to the video frame e also changes (from the laughing state to a zipped smile state), so the video frame e can also be determined as a changed video frame. As shown in FIG. 4b, since the lip from the video frame e to the video frame f does not change (both are in the zipped smile state), the video frame f is a non-changed video frame.

Further, the position coordinate of the target object in each changed video frame (including the video frame b, the video frame c, the video frame d, and the video frame e) can be determined. A specific manner of determining the position coordinate of the target object in the changed video frame may be as follows. Taking the video frame a as an example, a position center coordinate of the video frame b may be determined. Then, the position center coordinate of the video frame b may be taken as an origin coordinate, a coordinate system is established with the origin coordinate, and a position coordinate of the target object in the coordinate system is determined as the position coordinate of the target object in the video frame b. The position coordinate of the target object in the changed video frame may also be determined in other manners, which is not limited in this disclosure.

Position coordinate information of a target object in a motion state in the target video may be identified by the moving object identification component in the object identification model. A specific method may involve: inputting the video frame data into the object identification model. A background image in the video frame data may be identified by the moving object identification component in the object identification model. Then, a background pixel value of the background image and a video frame pixel value corresponding to the video frame data may be acquired. Then, a difference pixel value between the background pixel value and the video frame pixel value may be determined, and a region where the difference pixel value is located may be determined as the position coordinate of the target object in the video frame data.

Figure 4C:
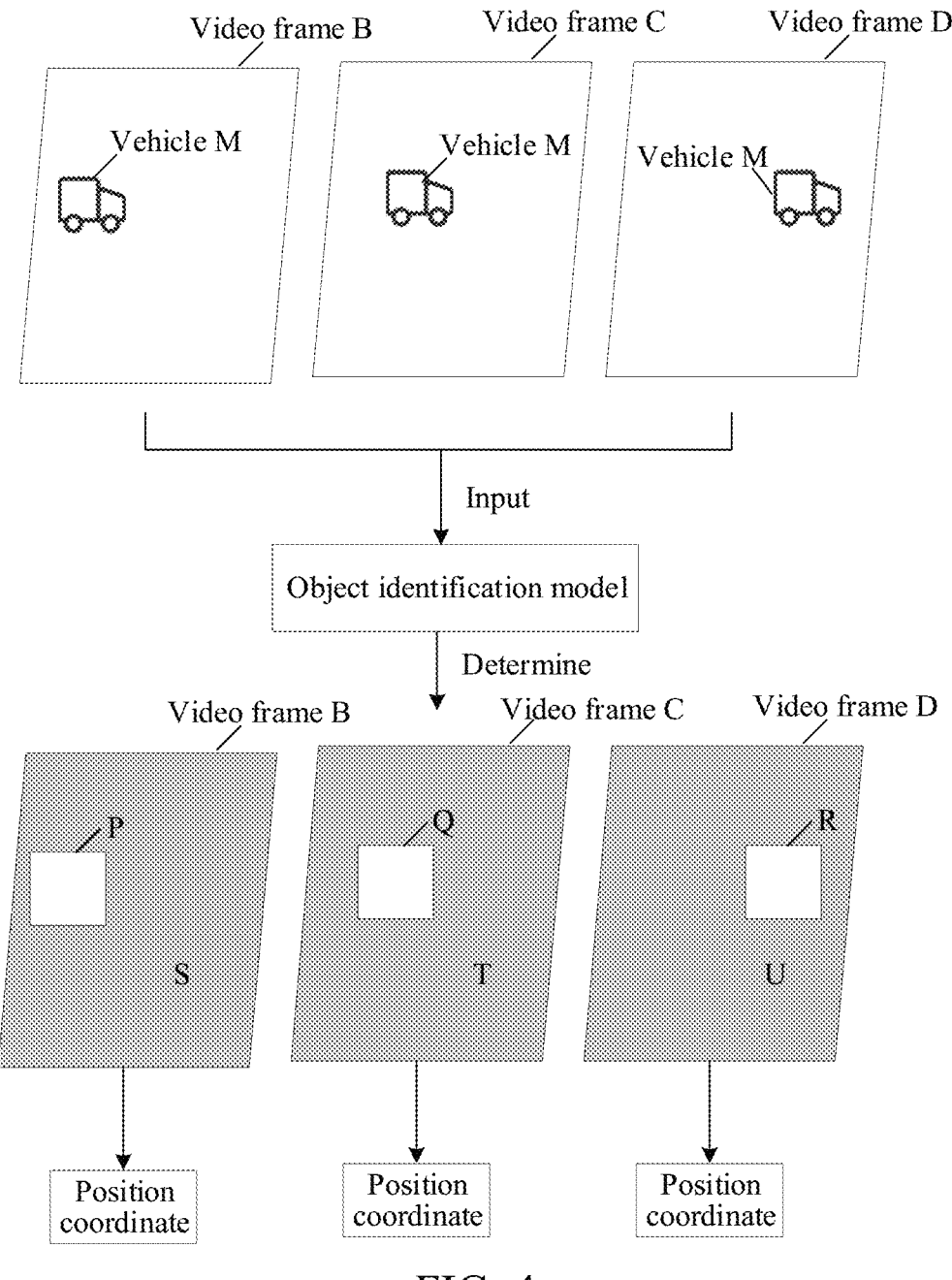
FIG. 4c is a schematic diagram of determination of a position coordinate of a target object according to an embodiment of this disclosure.

For ease of understanding, FIG. 4c is a schematic diagram of determination of a position coordinate of a target object according to an embodiment of this disclosure. As shown in FIG. 4c, a video frame B, a video frame C, and a video frame D are video frame data of a target video S. The video frame B, the video frame C, and the video frame D are time-continuous video frames. In other words, a timestamp of the video frame B is less than that of the video frame C, and the timestamp of the video frame C is less than that of the video frame D. As can be seen, the video frame B, the video frame C, and the video frame D all include the same target object (a vehicle M), and the target object is in a motion state in the target video S (the position of the target object changes in the video frame B, the video frame C, and the video frame D). As shown in FIG. 4c, a background image in each video frame (including the video frame B, the video frame C, and the video frame D) may be determined by the moving object identification component in the object identification model. Then, the moving object identification component may determine a pixel value of the background image and a pixel value of each video frame. The pixel value of the background image may be compared differentially with the pixel value of the video frame. That is, the pixel value of the background image may be matched with the pixel value of the video frame to obtain a difference pixel value. The difference pixel value may be understood as a pixel value corresponding to a region in which the vehicle M is located, so the region of the vehicle M in each video frame can be obtained. As shown in FIG. 4c, after the pixel value of each video frame (including the video frame B, the video frame C, and the video frame D) is compared with the pixel value of the background image, it may be obtained that the region of the vehicle M in the video frame B is a region P, the region of the vehicle M in the video frame C is a region Q, and the region of the vehicle M in the video frame D is a region R. Then, a position of the region P in the video frame B may be determined as a position coordinate of the vehicle M in the video frame B. Similarly, a position of the region Q in the video frame C may be determined as a position coordinate of the vehicle M in the video frame C. A position of the region R in the video frame D may be determined as a position coordinate of the vehicle M in the video frame D.

Figure 4D:
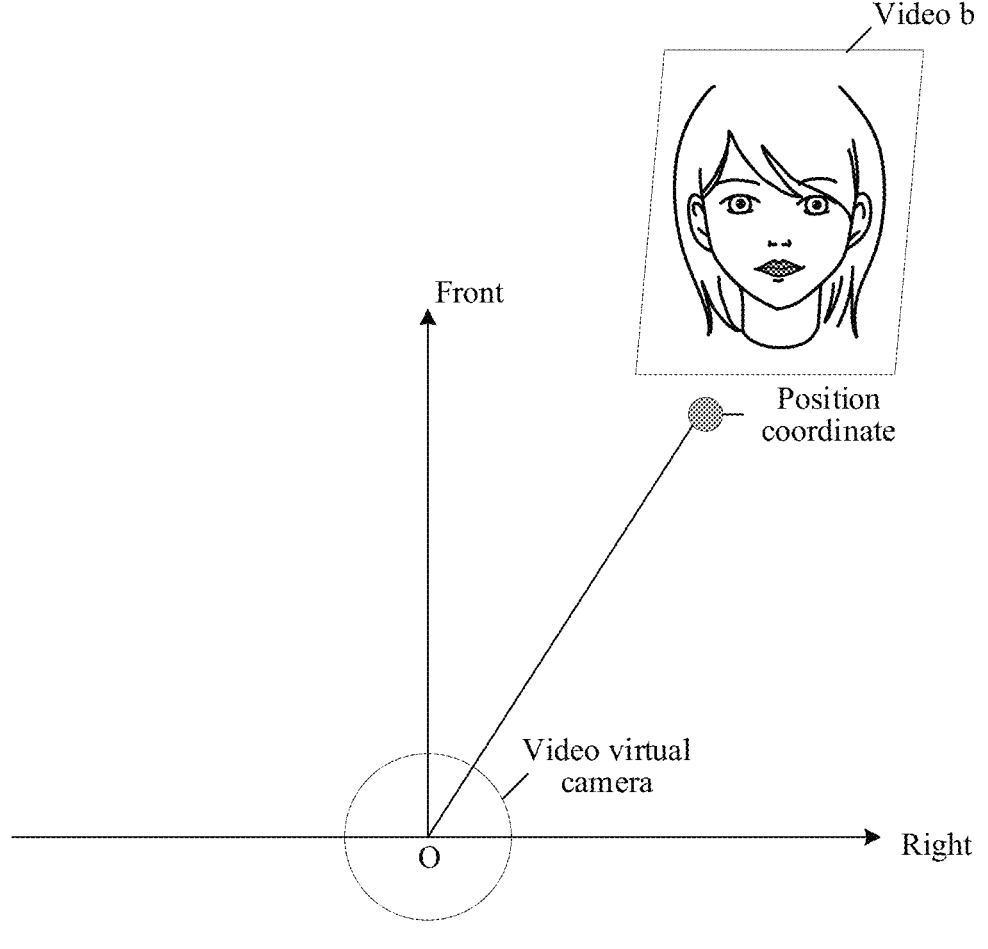
FIG. 4d is a schematic diagram of determination of position attribute information according to an embodiment of this disclosure.

Further, a specific method for determining the position attribute information of the target object in the target video according to the position coordinate of the target object may include: acquiring central position information of a virtual camera; and determining a depth of field distance between the target object and the central position information according to the position coordinate of the target object. It may be understood that a position offset angle between the target object and the video virtual camera may also be determined. Then, the depth of field distance and the position offset angle may be determined as the position attribute information of the target object. The video virtual camera here may be understood as a virtual camera simulating shooting of the target object. The target video is obtained by shooting the target object through the video virtual camera. It may be understood that a position of the video virtual camera is fixed and located directly in front of a center of the target video. For ease of understanding, referring to FIG. 4d together, FIG. 4d is a schematic diagram of determination of position attribute information according to an embodiment of this disclosure. In the embodiment corresponding to FIG. 4b, taking the position coordinate of the target object in the video frame b as an example, as shown in FIG. 4d, a position of a target object in a target video A may be determined through the position coordinate of the target object in the video frame b, and a depth of field distance between the target object and a central position (position O) of the video virtual camera may be obtained according to the position of the target object in the target video A. Position offset angles such as an azimuth angle and an elevation angle between the target object and the central position may also be obtained. Then, the information such as the depth of field distance, the azimuth angle, and the elevation angle may be determined as the position attribute information of the target object.

In step S103, a channel encoding parameter associated with the position attribute information is acquired, and azimuth enhancement processing is performed on the audio frame data according to the channel encoding parameter to obtain enhanced audio frame data (or enhanced audio data).

In this disclosure, each piece of position attribute information (including the depth of field distance, the azimuth angle, and the elevation angle) corresponds to a set of channel encoding parameters. Each set of channel encoding parameters may include a first channel encoding parameter and a second channel encoding parameter. The first channel encoding parameter and the second channel encoding parameter may be left and right ear channel encoding parameters. The first channel encoding parameter may be the left ear channel encoding parameter, and the second channel encoding parameter may be the right ear channel encoding parameter. The first channel encoding parameter may also be the right ear channel encoding parameter, and the second channel encoding parameter may be the left ear channel encoding parameter. A mapping relationship (correspondence) between the position attribute information (including the depth of field distance, the azimuth angle, and the elevation angle) and the channel encoding parameter may be stored in a parameter mapping table. The parameter mapping table may be acquired. In the parameter mapping table, a channel encoding parameter set having a mapping relationship with the position attribute information of the target object and including the first channel encoding parameter and the second channel encoding parameter may be acquired. Convolution processing may be performed on the audio frame data of the target video according to the first channel encoding parameter to obtain first enhanced audio frame data. Convolution processing may be performed on the audio frame data of the target video according to the second channel encoding parameter to obtain second enhanced audio frame data. Then, audio frame data formed by the first enhanced audio frame data and the second enhanced audio frame data may be determined as the enhanced audio frame data of the target video.

For ease of understanding, for example, the first channel encoding parameter is the left ear channel encoding parameter, and the second channel encoding parameter is the right ear channel encoding parameter. The parameter mapping table of position attribute information and channel encoding parameters may be shown in Table 1. In Table 1, hL(1)

denotes a left ear channel encoding parameter 1, hR(1) denotes a right ear channel encoding parameter 1, and hL(1) and hR(1) denote a channel encoding parameter set 1, which has a mapping relationship with position attribute information 1. Similarly, hL(2) and hR(2) denote a channel encoding parameter set 2, which has a mapping relationship with position attribute information 2. hL(3) and hR(3) denote a channel encoding parameter set 3, which has a mapping relationship with position attribute information 3. hL(4) and hR(4) denote a channel encoding parameter set 4, which has a mapping relationship with position attribute information 4. After the position attribute information of the target video is determined, for example, the determined position attribute information is the position attribute information 1, the channel encoding parameter set 1 having a mapping relationship with the position attribute information 1, i.e., hL(1) and hR(1), can be acquired through the parameter mapping table 1.

TABLE 1

|  | First channel encoding parameter | Second channel encoding parameter |
| --- | --- | --- |
| Position attribute information 1 | hL(1) | hR(1) |
| Position attribute information 2 | hL(2) | hR(2) |
| Position attribute information 3 | hL(3) | hR(3) |
| Position attribute information 4 | hL(4) | hR(4) |

A specific implementation of performing convolution processing on the audio frame data according to the first channel encoding parameter to obtain first enhanced audio frame data may be shown by Formula (1):

$$pL(t)=hL(t)*s(t) \qquad \text{Formula (1)}$$

where hL(t) may be used for representing the left ear channel encoding parameter (e.g., the first channel encoding parameter). It may be understood that the position attribute information of the target object may be determined by determining a position coordinate of the target object in the video frame at time t, so as to acquire the corresponding left ear channel encoding parameter hL(t). s(t) may be used for representing an audio frame (sound source signal) corresponding to the video frame at the time t. pL(t) may be used for representing the first enhanced audio frame data obtained after convolution processing on the left ear channel encoding parameter hL(t) and the audio frame s(t).

Similarly, a specific implementation of performing convolution processing on the audio frame data according to the second channel encoding parameter to obtain second enhanced audio frame data may be shown by Formula (2):

$$pR(t)=hR(t)*s(t) \qquad \text{Formula (2)}$$

where hR(t) may be used for representing the right ear channel encoding parameter (e.g., the second channel encoding parameter). It may be understood that the position attribute information of the target object may be determined by determining a position coordinate of the target object in the video frame at time t, so as to acquire the corresponding right ear channel encoding parameter hR(t). s(t) may be used for representing an audio frame (sound source signal) corresponding to the video frame at the time t.pR(t) may be used for representing the second enhanced audio frame data obtained after convolution processing on the right ear channel encoding parameter hR(t) and the audio frame s(t).

It is to be understood that the same audio frame data can be convolved with the left channel encoding parameter hL(t) and the right channel encoding parameter hR(t) respectively. The left and right channel encoding parameters have different processing effects on the audio frame data.

In another implementation, it may be understood that a specific manner of performing azimuth enhancement processing on the audio frame data according to the first channel encoding parameter and the second channel encoding parameter to obtain the enhanced audio frame data may also be as follows. The audio frame data is first mapped to a frequency domain, and then a multiplication operation is performed. After a multiplication operation result is obtained, the multiplication operation result is mapped back to a time domain. That is, frequency-domain conversion is first performed on the audio frame data to obtain frequency-domain audio frame data. Then, frequency-domain conversion is performed on the first channel encoding parameter and the second channel encoding parameter respectively to obtain a first channel frequency-domain encoding parameter and a second channel frequency-domain encoding parameter. Then, the first channel frequency-domain encoding parameter may be multiplied by the frequency-domain audio frame data to obtain first enhanced frequency-domain audio frame data. The second channel frequency-domain encoding parameter may be multiplied by the frequency-domain audio frame data to obtain second enhanced frequency-domain audio frame data. Then, time-domain conversion may be performed on the first enhanced frequency-domain audio frame data to obtain first enhanced audio frame data, and time-domain conversion may be performed on the second enhanced frequency-domain audio frame data to obtain second enhanced audio frame data. Audio frame data formed by the first enhanced audio frame data and the second enhanced audio frame data may be determined as the enhanced audio frame data.

A specific implementation of obtaining the first enhanced audio frame data by frequency-domain conversion may be shown by Formula (3):

$$pL(t)=\text{ifft}(HL(f)\cdot S(f)) \qquad \text{Formula (3)}$$

where HL(f) may be used for representing a left ear frequency-domain encoding parameter obtained after frequency-domain conversion on the left ear channel encoding parameter hL(t); S(f) may be used for representing a frequency-domain audio frame obtained after frequency-domain conversion on the audio frame s(t); HL(f).S(f) may be used for representing multiplying the left ear frequency-domain encoding parameter HL(f) by the frequency-domain audio frame S(f); and ifft may be used for representing time-domain conversion, and pL(t) may be used for representing the first enhanced audio frame data obtained after convolution processing on the left ear channel encoding parameter hL(t) and the audio frame s(t).

Similarly, a specific implementation of obtaining the second enhanced audio frame data by frequency-domain conversion may be shown by Formula (4):

$$pR(t)=\text{ifft}(HR(f)\cdot S(f)) \qquad \text{Formula (4)}$$

where HR(f) may be used for representing a right ear frequency-domain encoding parameter obtained after frequency-domain conversion on the right ear channel encoding parameter hR(t); S(f) may be used for representing a frequency-domain audio frame obtained after frequency-domain conversion on the audio frame s(t); HR(f).S(f) may be used for representing multiplying the right ear frequency-domain encoding parameter HR(f) by the frequency-domain audio frame S(f); and ifft may be used for representing time-domain conversion, and pR(t) may be used for representing the second enhanced audio frame data obtained after convolution processing on the right ear channel encoding parameter hR(t) and the audio frame s(t).

In another implementation, it may be understood that a user terminal may store the video frame data in association with the enhanced audio frame data including the first enhanced audio frame data and the second enhanced audio frame data in a cache server. Then, if a target user clicks/taps the target video for playback, the user terminal may acquire the video frame data and the enhanced audio frame data from the cache server in response to a video playback operation of the target user for the target video. Then, the user terminal may output the video frame data and the enhanced audio frame data. For the output of the enhanced audio frame data, the first enhanced audio frame data may be outputted through a first sound output channel of the user terminal. The second enhanced audio frame data may be outputted through a second sound output channel of the user terminal. It may be understood that the first enhanced audio frame data is obtained by azimuth enhancement processing according to the first channel encoding parameter such as the left ear channel encoding parameter, so the first enhanced audio frame data may be outputted through the left ear channel encoding parameter. The second enhanced audio frame data is obtained by azimuth enhancement processing according to the second channel encoding parameter such as the right ear channel encoding parameter, so the second enhanced audio frame data may be outputted through the right ear channel encoding parameter.

Figure 4E:
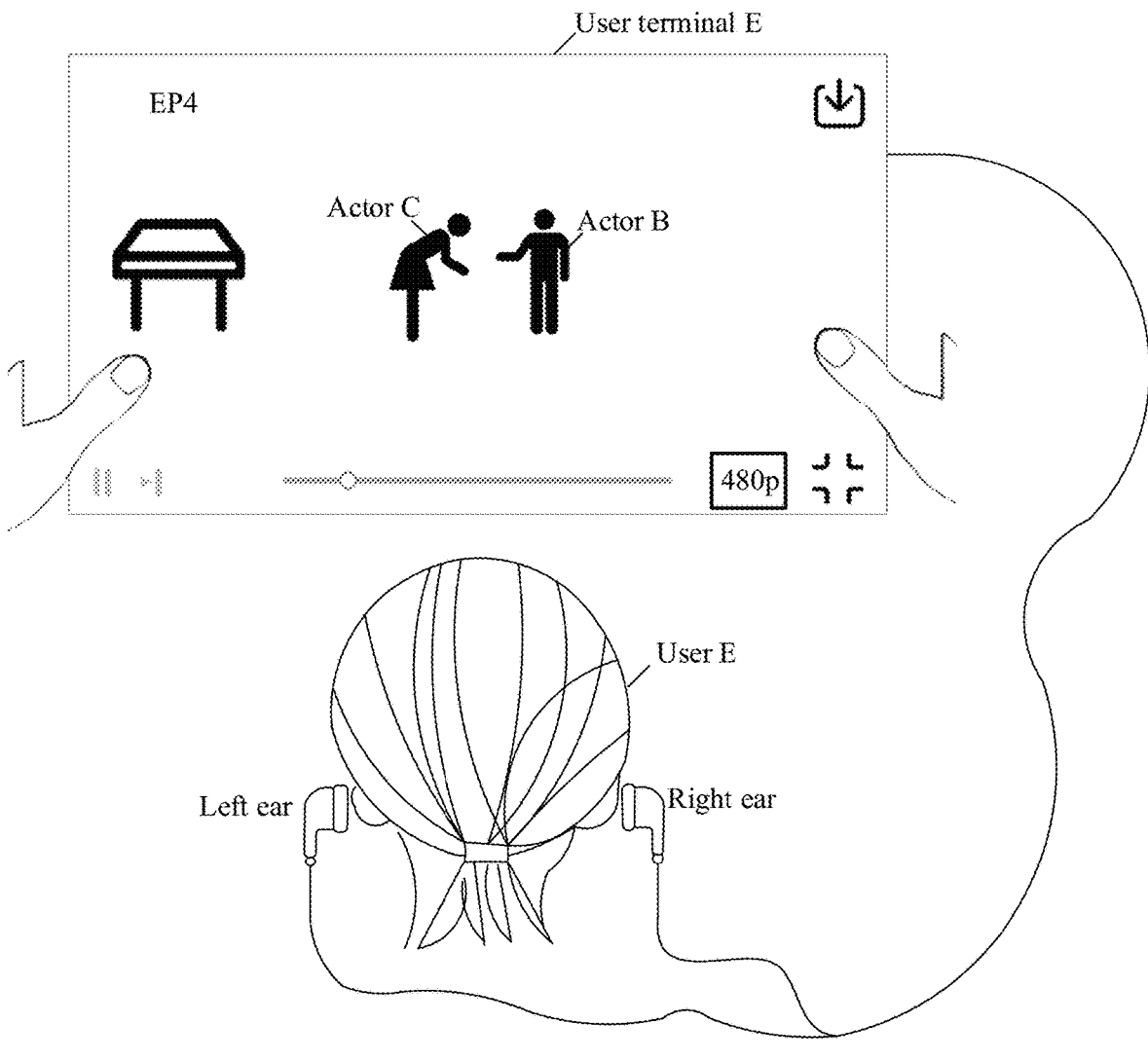
FIG. 4e is a schematic diagram of a scenario in which enhanced audio frame data is outputted according to an embodiment of this disclosure.

For ease of understanding, FIG. 4e is a schematic diagram of a scenario in which enhanced audio frame data is outputted according to an embodiment of this disclosure. As shown in FIG. 4e, video content of the target video EP4 is a crosstalk performance, and positions of an actor B and an actor C remain basically unchanged, so the actor B and the actor C may be considered to be in a rest state. In the target video EP4, only the actor B speaks, the actor B is located on the right of the target video EP4, and the actor C on the left of the target video EP4 is silent. A channel encoding parameter set (including a left channel encoding parameter and a right channel encoding parameter) may be acquired through position information of the actor B. Azimuth enhancement processing may be performed on audio frame data of the actor B through the left channel encoding parameter to obtain left channel enhanced audio frame data. Azimuth enhancement processing may be performed on the audio frame data of the actor B through the right channel encoding parameter to obtain right channel enhanced audio frame data. Then, when enhanced audio frame data of the actor B is outputted, the left channel enhanced audio frame data may be outputted through a left sound output channel, and the right channel enhanced audio frame data is outputted through a right sound output channel. In this way, when the user E (target user) watches the target video EP4, an audio heard by the user E's left ear is the left channel enhanced audio frame data outputted by the left sound output channel, and an audio heard by the user E's right ear is the right channel enhanced audio frame data outputted by the right sound output channel.

It is to be understood that, since the actor B is on the right of the target video EP4, after azimuth enhancement processing on the audio frame data of the actor B through the left channel encoding parameter and the right channel encoding parameter, the left channel enhanced audio frame data and the right channel enhanced audio frame data are clearly differentiated (e.g., the right channel enhanced audio frame data is louder than the left channel enhanced audio frame data). When the user E watches the target video EP4, it can be clearly felt that the actor B's sound is coming from the right ear. Thus, the sense of azimuth and space of the audio can be improved, and the user's sense of immersion in watching can be improved.

In the embodiment of this disclosure, after the video frame data and the audio frame data of the target video are acquired, the position attribute information of the target object in the target video in the video frame data can be identified, and then azimuth enhancement processing can be performed on the audio frame data of the target object through the left channel encoding parameter and the right channel encoding parameter that are associated with the position attribute information to obtain left channel enhanced audio frame data and right channel enhanced audio frame data. It is to be understood that the left channel encoding parameter and the right channel encoding parameter are both associated with the position attribute information. Different position attribute information is associated with different left channel encoding parameters and right channel encoding parameters. In other words, in this disclosure, different channel encoding parameters can be provided through the position attribute information of the target object, and the audio frame data can be dynamically optimized according to the different channel encoding parameters, so that audio has a sense of spatial movement as the position changes, and an audio optimization effect is improved. Moreover, the left channel enhanced audio frame data obtained through the left channel encoding parameter can be outputted through the left sound output channel, and the right channel enhanced audio frame data obtained through the right channel encoding parameter can be outputted through the right sound output channel. The left channel enhanced audio frame data and the right channel enhanced audio frame data are differentiated, so sound from the left ear and sound from the right ear are also differentiated when the user plays back the video frame data, enabling the user to clearly know whether current sound is coming from the left or from the right, thereby improving the sense of azimuth and space of the audio and improving the user's sense of immersion in watching.

Figure 5:
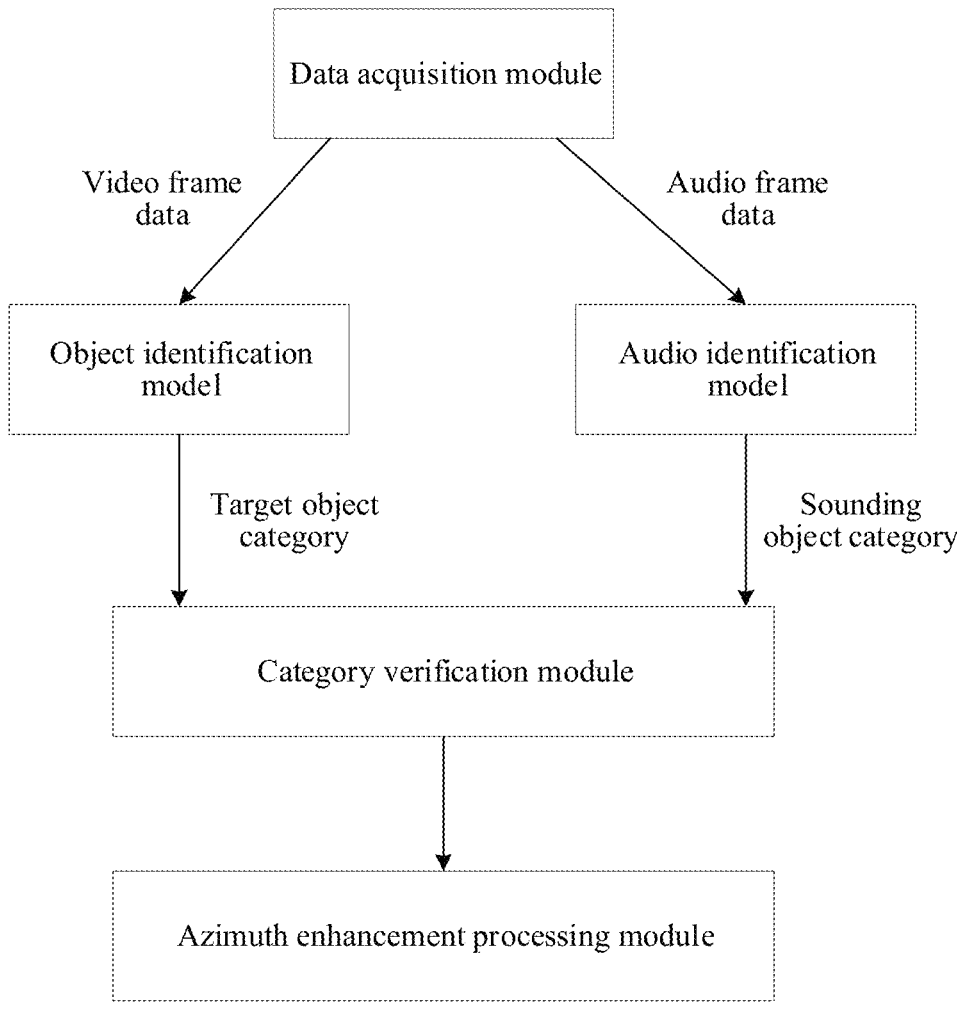
FIG. 5 is a diagram of a system architecture according to an embodiment of this disclosure.

Further, FIG. 5 is a diagram of a system architecture according to an embodiment of this disclosure. As shown in FIG. 5, the architecture may include a data acquisition module. The data acquisition module may be configured to acquire video frame data and audio frame data of a target video. A specific implementation of acquiring video frame data and audio frame data of a target video may be obtained with reference to the description in step S101 in the embodiment corresponding to FIG. 3. Details are not described herein. As shown in FIG. 5, the architecture may include an object identification model and an audio identification model. The video frame data is inputted to the object identification model. The object identification model can identify position attribute information of a target object in the target video, and may also identify a target object category of the target object. The audio frame data is inputted to the audio identification model. The audio identification model can identify a sounding object category to which the audio frame data belongs. As shown in FIG. 5, the architecture may further include a category verification module. The category verification module may be configured to verify whether a target object category the same as the sounding object category exists in target object categories identified by the object identification model. In other words, in the category verification module, a target object category outputted by the object identification model may be matched with a sounding object category outputted by the audio identification model to obtain a matching result. If the matching result is Successfully Matched, then the matching result indicates that the target object category matches a sounding object (or sound-emitting object) category. For example, the target object category is the same as the sounding object category, a channel encoding parameter associated with the position attribute information of the target object (e.g., the target object corresponding to the target object category the same as the sounding object category) successfully matched can be acquired, and azimuth enhancement processing can be performed on the audio frame data according to the channel encoding parameter to obtain enhanced audio frame data.

It is to be understood that the audio identification model may include a sound source classification component and a voiceprint identification component. The audio identification model can analyze whether the audio frame data is produced by one or more sounding objects and can determine a sounding object category of the one or more sounding objects. The audio identification model may be configured to verify the target object category outputted by the object identification model. When the verification is successful, azimuth enhancement processing may be performed on the audio frame data of the target video.

Figure 6:
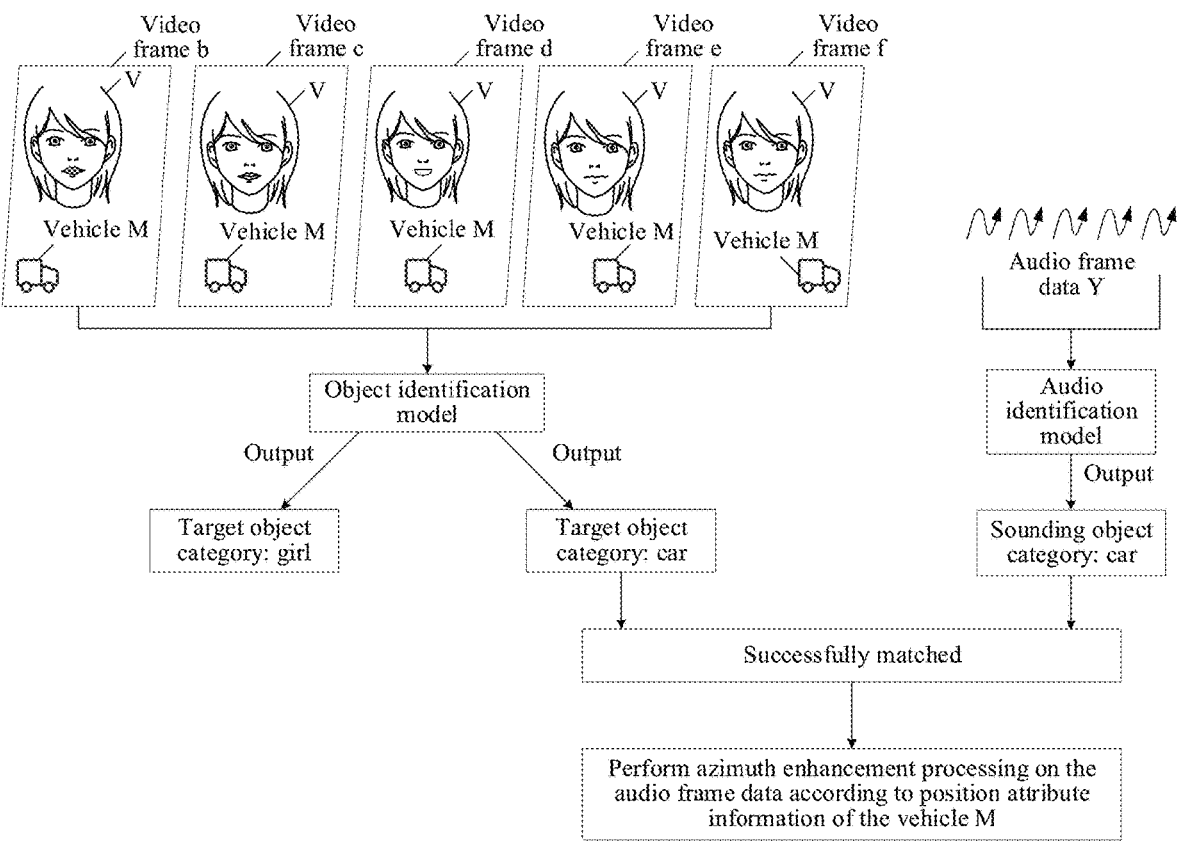
FIG. 6 is a schematic diagram of a scenario according to an embodiment of this disclosure.

For ease of understanding, FIG. 6 is a schematic diagram of a scenario according to an embodiment of this disclosure. As shown in FIG. 6, a video frame b, a video frame c, a video frame d, a video frame e, and a video frame f all include two target objects (a character V and a vehicle M). As can be seen, a lip of the character V in the video frame b is in a closed state, the lip of the character V in the video frame c is in a slightly open state, the lip of the character V in the video frame d is in a laughing state, the lip of the character V in the video frame e is in a zipped smile state, and the lip of the character V in the video frame f is in a zipped smile state. The lip of the character V from the video frame b to the video frame c changes (from the closed state to the slightly open state), the lip of the character V from the video frame c to the video frame d changes (from the slightly open state to the laughing state), and the lip of the character V from the video frame d to the video frame e changes (from the laughing state to the zipped smile state). Then, after the video frame b, the video frame c, the video frame d, the video frame e, and the video frame f are inputted to the object identification model, the object identification model may identify that the lip of the character V changes, and then the object identification model may determine the character V as a sounding object and determine an object category of the character V as "girl".

Similarly, as shown in FIG. 6, a position of the vehicle M in the video frame b is different from that in the video frame c, the position of the vehicle M in the video frame c is different from that in the video frame d, the position of the vehicle M in the video frame d is different from that in the video frame e, and the position of the vehicle M in the video frame e is different from that in the video frame f. As can be seen, the vehicle M is in a motion state. Then, after the video frame b, the video frame c, the video frame d, the video frame e, and the video frame f are inputted to the object identification model, the object identification model may determine the vehicle M as a sounding object and determine an object category of the vehicle M as "car".

Further, it may be understood that the video frame b, the video frame c, the video frame d, the video frame e, and the video frame f may be video frame data obtained after a video decapsulation tool decapsulates a target video H. Audio frame data Y corresponding to the target video H may also be obtained after the video decapsulation tool decapsulates the target video H. The audio frame data Y is inputted to the audio identification model. The audio identification model determines that the audio frame data is transmitted from one sounding object. The sounding object is a "car", and the "car" is the sounding object category identified by the audio identification model.

Further, the target object categories (including the object category "girl" and the object category "car") outputted by the object identification model may be matched with the sounding object category respectively. Since the target object category "girl" and the sounding object category "car" belong to different categories, the matching is not successful, which may indicate that, although the lip of the character V changes, the character V produces no sound. Since the target object category "car" and the sounding object category "car" belong to the same category, the matching is successful, and it may be determined that the audio frame data Y is transmitted from the vehicle M. Then, position attribute information of the vehicle M in the target video H may be acquired, a corresponding channel encoding parameter is acquired according to the position attribute information of the vehicle M, and azimuth enhancement processing is performed on the audio frame data Y according to the channel encoding parameter. A specific implementation of performing azimuth enhancement processing on the audio frame data Y according to the channel encoding parameter corresponding to the position attribute information of the vehicle M may be obtained with reference to the description of step S101 to step S103 in the embodiment corresponding to FIG. 3. Details are not described herein.

It may be understood that, since the position of the character V in the target video H does not change (the position of the character V in the video frame b, the video frame c, the video frame d, the video frame e, and the video frame f remains unchanged), a state of the character V may be determined as a rest state. Then, the object identification model may identify an object category of the character V through the lip motion detection component in the object identification model. Similarly, since a state of the vehicle M in the target video H is a motion state, the object identification model may identify an object category of the vehicle M through the moving object detection component in the object identification model.

Figure 7A:
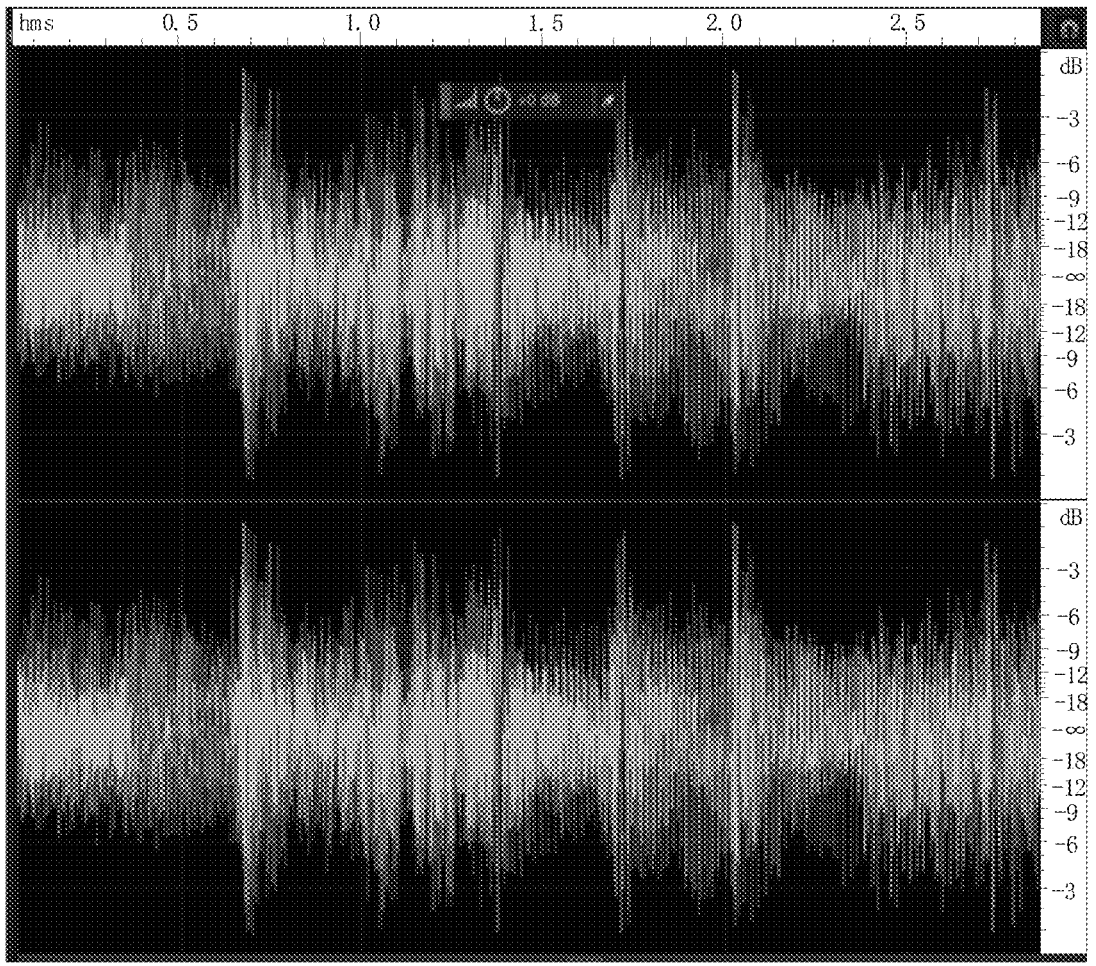
FIG. 7a and FIG. 7b are diagrams of comparison between experimental data according to an embodiment of this disclosure.
Figure 7B:
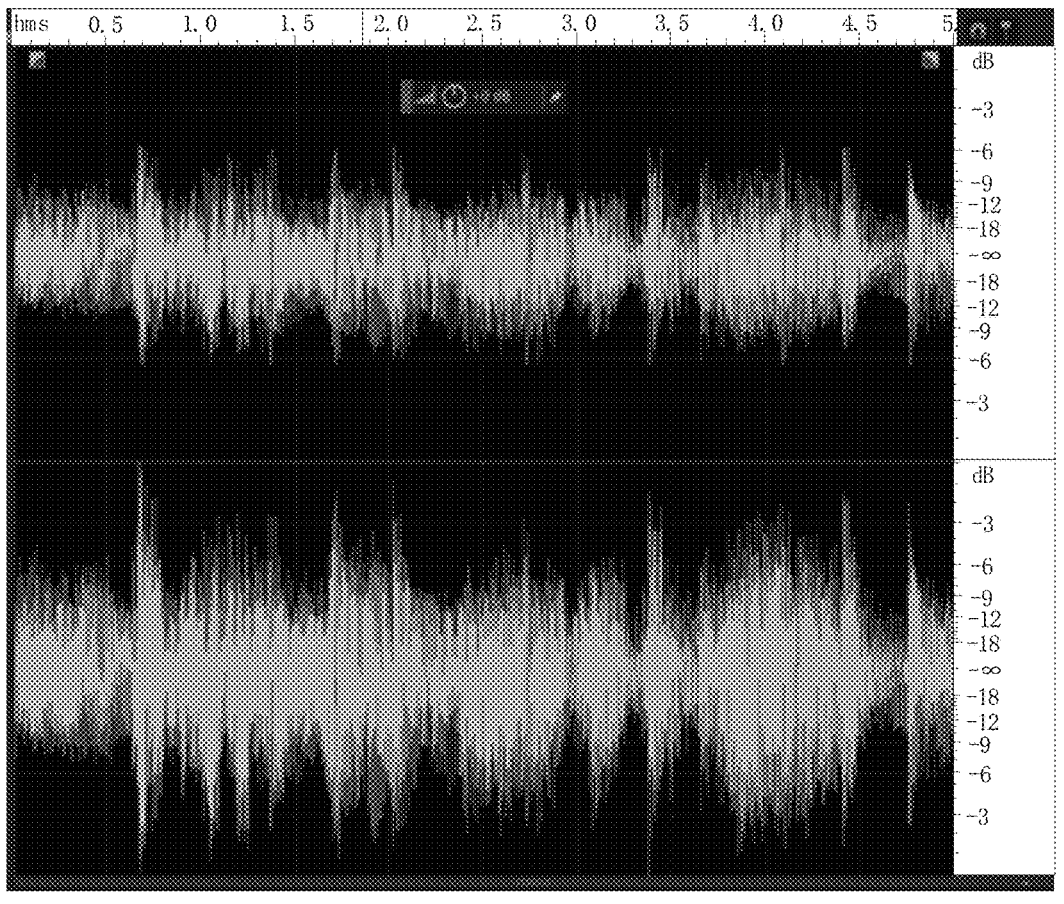

In order to further illustrate the beneficial effects of this disclosure, FIG. 7a and FIG. 7b are diagrams of comparison between experimental data according to an embodiment of this disclosure. Data used in this experiment is a video clip of a crosstalk performance. In the video clip, only the actor on the right speaks and the actor on the left is silent. As shown in FIG. 7a, FIG. 7a is a waveform diagram of an original sound signal, and upper and lower waveforms shown in FIG. 7a are signal waveforms of left and right channels respectively. As can be seen, signal heights of the left and right channels are consistent and cannot be distinguished. FIG. 7b is a waveform diagram of an enhanced sound signal after azimuth enhancement processing according to this disclosure, and upper and lower waveforms shown in FIG. 7b are signal waveforms of left and right channels respectively. As can be seen, the upper and lower waveforms are clearly differentiated. That is, the left and right channels are clearly differentiated. When the user is watching a video, the user's auditory perception is that sound is coming from the right. In other words, according to this disclosure, the sense of azimuth and space of the audio can be improved, and the user's sense of immersion in watching can be improved.

Figure 8:
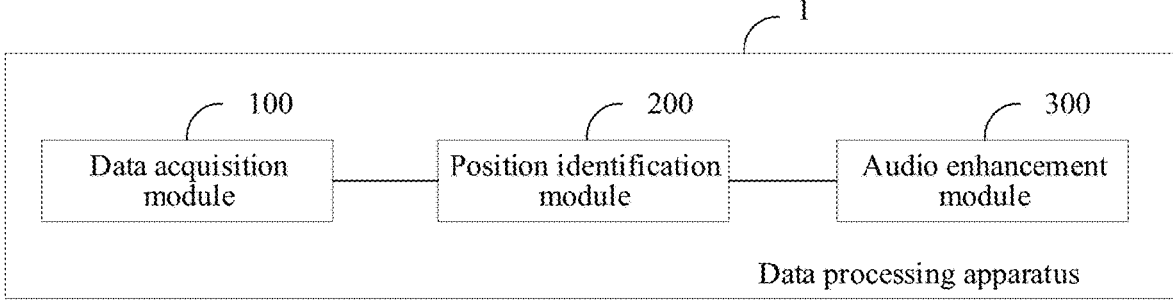
FIG. 8 is a schematic structural diagram of a data processing apparatus according to an embodiment of this disclosure.

Further, FIG. 8 is a schematic structural diagram of a data processing apparatus according to an embodiment of this disclosure. As shown in FIG. 8, the data processing apparatus 1 may include: a data acquisition module 100, a position identification module 200, and an audio enhancement module 300. One or more modules of the apparatus can be implemented by processing circuitry, software, or a combination thereof, for example.

The data acquisition module 100 is configured to acquire video frame data and audio frame data of a target video.

The position identification module 200 is configured to determine position attribute information of a target object in the target video according to the video frame data. The target object is associated with the audio frame data.

The audio enhancement module 300 is configured to acquire a channel encoding parameter associated with the position attribute information, and perform azimuth enhancement processing on the audio frame data according to the channel encoding parameter to obtain enhanced audio frame data.

Specific implementations of the data acquisition module 100, the position identification module 200, and the audio enhancement module 300 may be obtained with reference to the description of step S101 to step S103 in the embodiment corresponding to FIG. 3. Details are not described herein.

It may be understood that the data processing apparatus 1 in the embodiment of this disclosure may perform the data processing method in the embodiment corresponding to FIG. 3. Details are not described herein. In addition, the description of beneficial effects of the same method is not described herein again.

Figure 9:
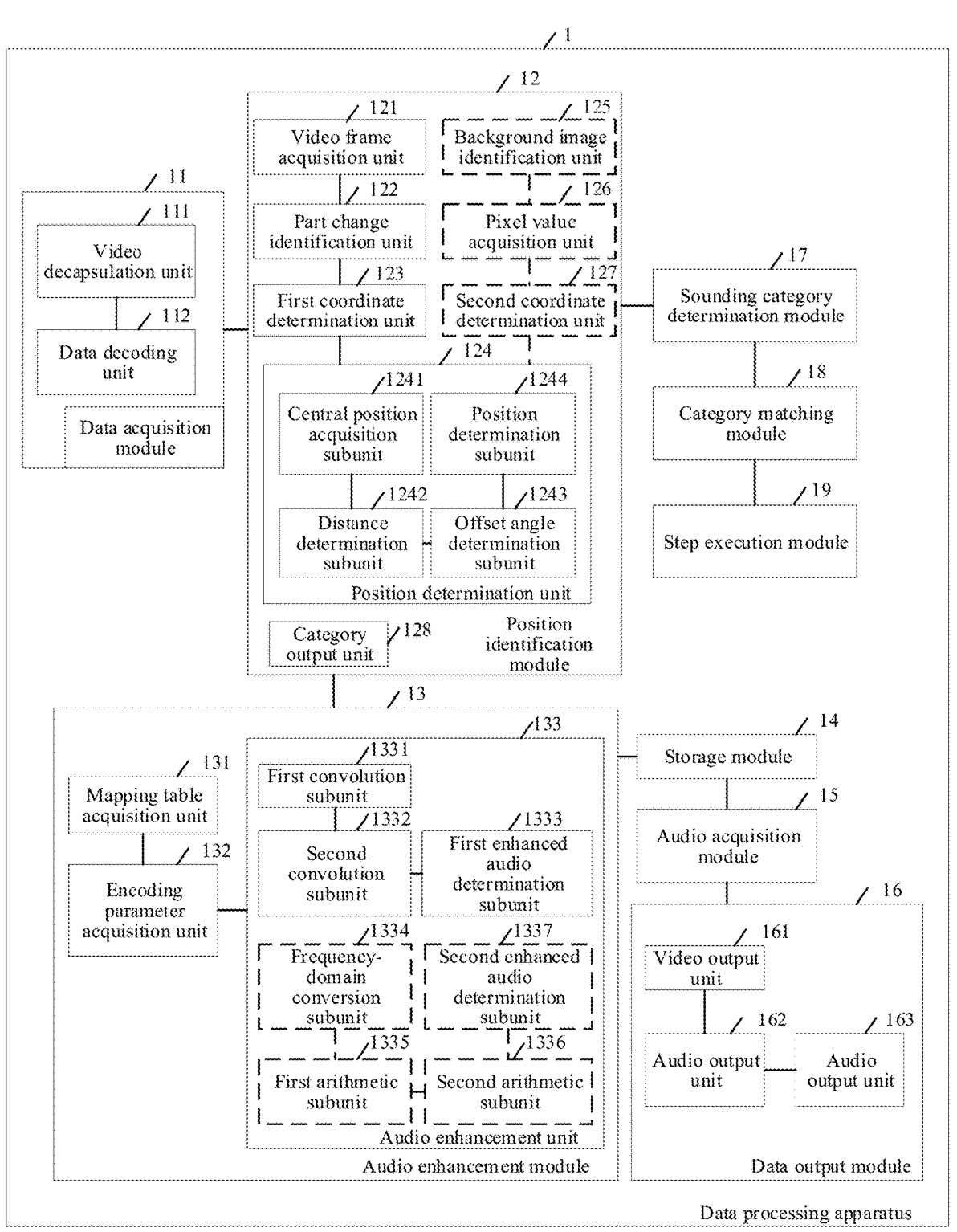
FIG. 9 is a schematic structural diagram of a data processing apparatus according to an embodiment of this disclosure.

Further, FIG. 9 is a schematic structural diagram of a data processing apparatus according to an embodiment of this disclosure. The data processing apparatus may be a computer program (including program code) running in a computer device. For example, the data processing apparatus is application software. The data processing apparatus may be configured to perform the method shown in FIG. 3. As shown in FIG. 9, the data processing apparatus 2 may include: a data acquisition module 11, a position identification module 12, and an audio enhancement module 13.

Specific implementations of the data acquisition module 11, the position identification module 12, and the audio enhancement module 13 are respectively consistent with the data acquisition module 100, the position identification module 200, and the audio enhancement module 300 in FIG. 8. Details are not described herein.

Referring to FIG. 9, the data acquisition module 11 may include: a video decapsulation unit 111 and a data decoding unit 112.

The video decapsulation unit 111 is configured to acquire the target video, input the target video to a video decapsulation component, and decapsulate the target video through the video decapsulation component to obtain video stream data and audio stream data.

The data decoding unit 112 is configured to decode the video stream data and the audio stream data respectively in the video decapsulation component to obtain the video frame data and the audio frame data.

Specific implementations of the video decapsulation unit 111 and the data decoding unit 112 may be obtained with reference to the description of step S101 in the embodiment corresponding to FIG. 3. Details are not described herein.

When the target object is an object in a rest state, referring to FIG. 9, in one implementation, the position identification module 12 may, as shown by the solid lines, include: a video frame acquisition unit 121, a part change identification unit 122, a first coordinate determination unit 123, and a position determination unit 124.

The video frame acquisition unit 121 is configured to input the video frame data to an object identification model, and acquire N pieces of continuous video frame data from the object identification model. The N pieces of continuous video frame data is video frame data with continuous timestamps. Each of the N pieces of continuous video frame data includes the target object. N is a positive integer less than or equal to M, and M is a total quantity of the video frame data. M is an integer greater than 1.

The part change identification unit 122 is configured to identify, in the N pieces of continuous video frame data, video frame data in which a sounding part of the target object changes, and take the video frame data in which the sounding part of the target object changes as changed video frame data.

The first coordinate determination unit 123 is configured to determine a position coordinate of the target object in the changed video frame data.

The position determination unit 124 is configured to determine the position attribute information of the target object in the target video according to the position coordinate.

Specific implementations of the video frame acquisition unit 121, the part change identification unit 122, the first coordinate determination unit 123, and the position determination unit 124 may be obtained with reference to the description of step S102 in the embodiment corresponding to FIG. 3. Details are not described herein.

When the target object is an object in a motion state, referring to FIG. 9, in another implementation, the position identification module 12 may, as shown by the dotted lines, include: a background image identification unit 125, a pixel value acquisition unit 126, and a second coordinate determination unit 127.

The background image identification unit 125 is configured to input the video frame data to an object identification model, and identify a background image in the video frame data through the object identification model.

The pixel value acquisition unit 126 is configured to acquire a background pixel value of the background image, and acquire a video frame pixel value corresponding to the video frame data.

The second coordinate determination unit 127 is configured to determine a difference pixel value between the background pixel value and the video frame pixel value, and determine a region where the difference pixel value is located as a position coordinate of the target object in the video frame data.

The position determination unit 124 is configured to determine the position attribute information of the target object in the target video according to the position coordinate.

Specific implementations of the background image identification unit 125, the pixel value acquisition unit 126, the second coordinate determination unit 127, and the position determination unit 124 may be obtained with reference to the description of step S102 in the embodiment corresponding to FIG. 3. Details are not described herein.

Referring to FIG. 9, in one implementation, the position determination unit 124 may include: a central position acquisition subunit 1241, a distance determination subunit 1242, an offset angle determination subunit 1243, and a position determination subunit 1244.

The central position acquisition subunit 1241 is configured to acquire central position information of a video virtual camera. The video virtual camera is a virtual camera simulating shooting of the target object.

The distance determination subunit 1242 is configured to determine a depth of field distance between the target object and the central position information according to the position coordinate.

The offset angle determination subunit 1243 is configured to determine a position offset angle between the target object and the video virtual camera.

The position determination subunit 1244 is configured to determine the depth of field distance and the position offset angle as the position attribute information of the target object.

Specific implementations of the central position acquisition subunit 1241, the distance determination subunit 1242, the offset angle determination subunit 1243, and the position determination subunit 1244 may be obtained with reference to the description of step S102 in the embodiment corresponding to FIG. 3. Details are not described herein.

Referring to FIG. 9, in one implementation, the azimuth enhancement module 13 may include: a mapping table acquisition unit 131, an encoding parameter acquisition unit 132, and an azimuth enhancement unit 133.

The mapping table acquisition unit 131 is configured to acquire a parameter mapping table. The parameter mapping table includes at least two parameter mapping relationships. One parameter mapping relationship includes a mapping relationship between one piece of position attribute information and one channel encoding parameter. The one piece of position attribute information includes a depth of field distance and a position offset angle.

The encoding parameter acquisition unit 132 is configured to acquire, from the parameter mapping table, a channel encoding parameter having a mapping relationship with the position attribute information of the target object.

The audio enhancement unit 133 is configured to perform azimuth enhancement processing on the audio frame data according to the channel encoding parameter having a mapping relationship to obtain the enhanced audio frame data.

Specific implementations of the mapping table acquisition unit 131, the encoding parameter acquisition unit 132, and the azimuth enhancement unit 133 may be obtained with reference to the description of step S103 in the embodiment corresponding to FIG. 3. Details are not described herein.

The channel encoding parameter having a mapping relationship includes a first channel encoding parameter and a second channel encoding parameter.

Referring to FIG. 9, in one implementation, the azimuth enhancement unit 133 may, as shown by the solid lines, include: a first convolution subunit 1331, a second convolution subunit 1332, and a first enhanced audio determination subunit 1333.

The first convolution subunit 1331 is configured to perform convolution processing on the audio frame data according to the first channel encoding parameter to obtain first enhanced audio frame data.

The second convolution subunit 1332 is configured to perform convolution processing on the audio frame data according to the second channel encoding parameter to obtain second enhanced audio frame data.

The first enhanced audio determination subunit 1333 is configured to determine audio frame data formed by the first enhanced audio frame data and the second enhanced audio frame data as the enhanced audio frame data.

Specific implementations of the first convolution subunit 1331, the second convolution subunit 1332, and the first enhanced audio determination subunit 1333 may be obtained with reference to the description of step S103 in the embodiment corresponding to FIG. 3. Details are not described herein.

The channel encoding parameter having a mapping relationship includes a first channel encoding parameter and a second channel encoding parameter.

Referring to FIG. 9, in another implementation, the azimuth enhancement unit 133 may, as shown by the dotted lines, include: a frequency-domain conversion subunit 1334, a first arithmetic subunit 1335, a second arithmetic subunit 1336, and a second enhanced audio determination subunit 1337.

The frequency-domain conversion subunit 1334 is configured to perform frequency-domain conversion on the audio frame data to obtain frequency-domain audio frame data.

The frequency-domain conversion subunit 1334 is further configured to perform frequency-domain conversion on the first channel encoding parameter and the second channel encoding parameter respectively to obtain a first channel frequency-domain encoding parameter and a second channel frequency-domain encoding parameter.

The first arithmetic subunit 1335 is configured to multiply the first channel frequency-domain encoding parameter by the frequency-domain audio frame data to obtain first enhanced frequency-domain audio frame data.

The second arithmetic subunit 1336 is configured to multiply the second channel frequency-domain encoding parameter by the frequency-domain audio frame data to obtain second enhanced frequency-domain audio frame data.

The second enhanced audio determination subunit 1337 is configured to determine the enhanced audio frame data according to the first enhanced frequency-domain audio frame data and the second enhanced frequency-domain audio frame data.

Specific implementations of the frequency-domain conversion subunit 1334, the first arithmetic subunit 1335, the second arithmetic subunit 1336, and the second enhanced audio determination subunit 1337 may be obtained with reference to the description of step S103 in the embodiment corresponding to FIG. 3. Details are not described herein.

The second enhanced audio determination subunit 1337 is further configured to perform time-domain conversion on the first enhanced frequency-domain audio frame data to obtain first enhanced audio frame data.

The second enhanced audio determination subunit 1337 is further configured to perform time-domain conversion on the second enhanced frequency-domain audio frame data to obtain second enhanced audio frame data.

The second enhanced audio determination subunit 1337 is further configured to determine audio frame data formed by the first enhanced audio frame data and the second enhanced audio frame data as the enhanced audio frame data.

Referring to FIG. 9, the data processing apparatus 2 may further include: a storage module 14, an audio acquisition module 15, and a data output module 16.

The storage module 14 is configured to associatively store the video frame data and the enhanced audio frame data to a cache server.

The audio acquisition module 15 is configured to acquire the video frame data and the enhanced audio frame data from the cache server in response to a video playback operation for the target video.

The data output module 16 is configured to output the video frame data and the enhanced audio frame data.

Specific implementations of the storage module 14, the audio acquisition module 15, and the data output module 16 may be obtained with reference to the description in step S103 in the embodiment corresponding to FIG. 3. Details are not described herein.

Referring to FIG. 9, the data output module 16 may include: a video output unit 161, an audio output unit 162, and an audio output unit 163.

The video output unit 161 is configured to output the video frame data.

The audio output unit 162 is configured to output the first enhanced audio frame data through a first sound output channel of a user terminal.

The audio output unit 163 is configured to output the second enhanced audio frame data through a second sound output channel of the user terminal.

Specific implementations of the video output unit 161, the audio output unit 162, and the audio output unit 163 may be obtained with reference to the description of step S103 in the embodiment corresponding to FIG. 3. Details are not described herein.

Referring to FIG. 9, the position identification module 12 may include:

a category output unit 128 configured to input the video frame data to an object identification model, and output a target object category of the target object and the position attribute information of the target object in the target video through the object identification model.

Then, the data processing apparatus 2 may further include: a sounding category determination module 17, a category matching module 18, and a step execution module 19.

The sounding category determination module 17 is configured to input the audio frame data to an audio identification model, and determine, through the audio identification model, a sounding object category to which the audio frame data belongs.

The category matching module 18 is configured to match the target object category with the sounding object category to obtain a matching result.

The step execution module 19 is configured to perform the operation of acquiring a channel encoding parameter associated with the position attribute information, and performing azimuth enhancement processing on the audio frame data according to the channel encoding parameter to obtain enhanced audio frame data in a case that the matching result is Successfully Matched.

Specific implementations of the category output unit 128, the sounding category determination module 17, the category matching module 18, and the step execution module 19 may be obtained with reference to the description about the matching of the object categories in the embodiment corresponding to FIG. 5. Details are not described herein.

In the embodiment of this disclosure, after the video frame data and the audio frame data of the target video are acquired, the position attribute information of the target object in the target video in the video frame data can be identified, and then azimuth enhancement processing can be performed on the audio frame data of the target object through the left channel encoding parameter and the right channel encoding parameter that are associated with the position attribute information to obtain left channel enhanced audio frame data and right channel enhanced audio frame data. It is to be understood that the left channel encoding parameter and the right channel encoding parameter are both associated with the position attribute information. Different position attribute information is associated with different left channel encoding parameters and right channel encoding parameters. In other words, in this disclosure, different channel encoding parameters can be provided through the position attribute information of the target object, and the audio frame data can be dynamically optimized according to the different channel encoding parameters, so that audio has a sense of spatial movement as the position changes, and an audio optimization effect is improved. Moreover, the left channel enhanced audio frame data obtained through the left channel encoding parameter can be outputted through the left sound output channel, and the right channel enhanced audio frame data obtained through the right channel encoding parameter can be outputted through the right sound output channel. The left channel enhanced audio frame data and the right channel enhanced audio frame data are differentiated, so sound from the left ear and sound from the right ear are also differentiated when the user plays back the video frame data, enabling the user to clearly know whether current sound is coming from the left or from the right, thereby improving the sense of azimuth and space of the audio and improving the user's sense of immersion in watching.

Figure 10:
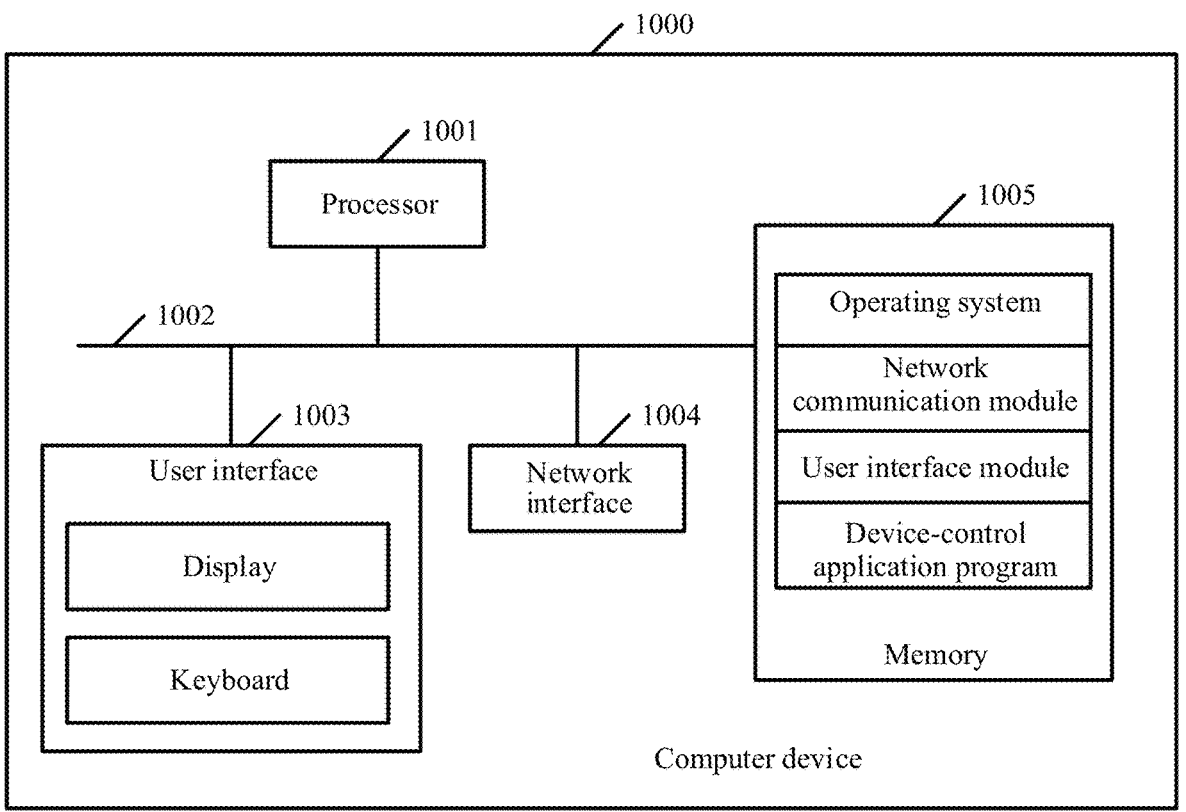
FIG. 10 is a schematic structural diagram of a computer device according to an embodiment of this disclosure.

Further, FIG. 10 is a schematic structural diagram of a computer device according to an embodiment of this disclosure. As shown in FIG. 10, the computer device 1000 may be a user terminal or a service server. The user terminal may be the user terminal in the embodiment corresponding to FIG. 2a or FIG. 2b. The service server may be the service server 1000 in the embodiment corresponding to FIG. 1. For example, the computer device 1000 is a user terminal. The computer device 1000 may include: a processor 1001 (including processing circuitry), a network interface 1004, and a memory 1005. In addition, the computer device 1000 further includes: a user interface 1003, and at least one communication bus 1002. The communication bus 1002 is configured to implement connection and communication between the components. The user interface 1003 may include a display and a keyboard. The user interface 1003 may further include a standard wired interface and a standard wireless interface. The network interface 1004 may include a standard wired interface and a standard wireless interface (such as a Wi-Fi interface). The memory 1005 may be a high-speed RAM, or may be a non-volatile memory, for example, at least one magnetic disk memory. The memory 1005 may be at least one storage apparatus that is located far away from the foregoing processor 1001. As shown in FIG. 10, the memory 1005 used as a computer-readable storage medium may include an operating system, a network communication module, a user interface module, and a device-control application program.

In the computer device 1000 shown in FIG. 10, the network interface 1004 may provide a network communication function. The user interface 1003 is mainly configured to provide an input interface for a user. The processor 1001 may be configured to call the device-control application program stored in the memory 1005, to acquire video frame data and audio frame data (audio data) of a video, determine position attribute information of a target object in the video according to the video frame data, where the target object is associated with the audio frame data, acquire a channel encoding parameter associated with the position attribute information, and perform azimuth enhancement processing on the audio frame data according to the channel encoding parameter to obtain enhanced audio frame data (enhanced audio data).

It may be understood that the computer device 1000 described in the embodiment of this disclosure can perform the description of the data processing method in the embodiment corresponding to FIG. 3, can also perform the description of the data processing apparatus 1 in the embodiment corresponding to FIG. 8, and can also perform the description of the data processing apparatus 2 in the embodiment corresponding to FIG. 9. Details are not described herein. In addition, the description of beneficial effects of the same method is not described herein again.

In addition, an embodiment of this disclosure further provides a non-transitory computer-readable storage medium. The computer-readable storage medium stores a computer program executed by the computer device 1000 for data processing mentioned above, and the computer program includes program instructions. When executing the program instructions, the processor can perform the descriptions of the data processing method in the embodiment corresponding to FIG. 3. Therefore, details are not described herein again. In addition, the description of beneficial effects of the same method is not described herein again. For technical details that are not disclosed in the computer-readable storage medium embodiments of this disclosure, refer to the descriptions of the method embodiments of this disclosure.

The computer-readable storage medium may be a data identification apparatus according to any one of the foregoing embodiments or an internal storage unit of the computer device, such as a hard disk or an internal memory of the computer device. The computer-readable storage medium may also be an external storage device of the computer device, such as a plugged hard disk, a smart media card (SMC), a secure digital (SD) card, and a flash memory card provided on the computer device. Further, the computer-readable storage medium may also include both an internal storage module and an external storage device of the computer device. The computer-readable storage medium is configured to store the computer program and other programs and data required by the computer device. The computer-readable storage medium may also be configured to temporarily store data that has been or will be outputted.

According to an aspect of this disclosure, a computer program product or a computer program is provided, the computer program product or the computer program including computer instructions, the computer instructions being stored in a computer-readable storage medium. A processor of a computer device reads the computer instructions from the computer-readable storage medium. The processor executes the computer instructions, to cause the computer device to perform the method according to one aspect of the embodiments of this disclosure.

In the specification, claims, and accompanying drawings of the embodiments of this disclosure, the terms "first", "second", and so on are intended to distinguish different objects but do not necessarily indicate a specific order. In addition, the terms "include" and any variant thereof are intended to cover a non-exclusive inclusion. For example, a process, method, apparatus, product, or device that includes a series of steps or units is not limited to the listed steps or modules. Instead, a step or module that is not listed may be further included, or another step or module that is intrinsic to the process, method, apparatus, product, or device may be further included.

A person of ordinary skill in the art may be aware that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this disclosure.

The methods and the related apparatuses according to the embodiments of this disclosure are described with reference to the method flowcharts and/or schematic structural diagrams according to the embodiments of this disclosure. In an embodiment, each flow and/or block of a method flowchart and/or a schematic structural diagram and combinations of flows and/or blocks in a flowchart and/or a block diagram are realized through computer program instructions. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the schematic structural diagrams. These computer program instructions may also be stored in a computer readable memory that can guide a computer or another programmable data processing device to work in a specified manner, so that the instructions stored in the computer readable memory generate a product including an instruction apparatus, where the instruction apparatus implements functions specified in one or more procedures in the flowcharts and/or one or more blocks in the schematic structural diagrams. The computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A data processing method, comprising:

acquiring video frame data including one or more video frames and audio data of a video;

determining, by processing circuitry of a data processing apparatus, position attribute information of a target object in the acquired one or more video frames, the target object being associated with the audio data; and acquiring, from a parameter mapping table that stores a mapping relationship between predefined channel encoding parameters associated with ear positions of a user and relative positions of the target object with respect to the ear positions of the user, a set of channel encoding parameters including a first channel encoding parameter associated with a first one of the ear positions of the user and a second channel encoding parameter associated with a second one of the ear positions of the user for different audio channels corresponding to the position attribute information;

performing azimuth enhancement processing on the audio data based on the set of channel encoding parameters, the azimuth enhancement processing comprising:

processing the audio data based on the first channel encoding parameter to obtain first enhanced audio data;

processing the audio data based on the second channel encoding parameter to obtain second enhanced audio data; and generating enhanced audio data from the first enhanced audio data and the second enhanced audio data, the first enhanced audio data being louder than the second enhanced audio data to the user based on the position attribute information of the target object indicating that the target object is closer to the first one of the ear positions of the user than the second one of the ear positions of the user.

2. The method according to claim 1, wherein the acquiring the video frame data and the audio data comprises:

acquiring the video, inputting the video to a video decapsulation component, and decapsulating the video through the video decapsulation component to obtain video stream data and audio stream data; and decoding the video stream data and the audio stream data respectively in the video decapsulation component to obtain the video frame data and the audio data.

3. The method according to claim 1, wherein the target object is an object in a rest state; and the determining comprises:

inputting the video frame data to an object identification model, and acquiring N continuous video frames from the object identification model, the N continuous video frames being video frames with continuous timestamps, each of the N continuous video frames comprising the target object, N being a positive integer less than or equal to M, M being a total quantity of video frames in the video frame data, M being an integer greater than 1;

identifying, in the N continuous video frames, video frames in which a sound emitting part of the target object changes, and setting the video frames in which the sound emitting part of the target object changes as changed video frames;

determining a position coordinate of the target object in the changed video frames; and determining the position attribute information of the target object in the video according to the position coordinate.

4. The method according to claim 1, wherein the target object is an object in a motion state; and the determining comprises:

inputting the video frame data to an object identification model, and identifying a background image in the video frame data through the object identification model;

acquiring a background pixel value of the background image, and acquiring a video frame pixel value corresponding to the video frame data;

determining a difference pixel value between the background pixel value and the video frame pixel value, and determining a region in the one or more video frames where the difference pixel value is located as a position coordinate of the target object; and determining the position attribute information of the target object in the video according to the position coordinate.

5. The method according to claim 3, wherein the determining the position attribute information of the target object in the video according to the position coordinate comprises:

acquiring central position information of a virtual camera, the virtual camera simulating shooting of the target object;

determining a depth of field distance between the target object and the central position information according to the position coordinate;

determining a position offset angle between the target object and the virtual camera; and determining the depth of field distance and the position offset angle as the position attribute information of the target object.

6. The method according to claim 1, wherein the processing the audio data based on the first channel encoding parameter comprises:

performing convolution processing on the audio data according to the first channel encoding parameter to obtain the first enhanced audio data; and the processing the audio data based on the second channel encoding parameter comprises:

performing the convolution processing on the audio data according to the second channel encoding parameter to obtain the second enhanced audio data.

7. The method according to claim 1, wherein the processing the audio data based on the first channel encoding parameter to obtain the first enhanced audio data and the processing the audio data based on the second channel encoding parameter to obtain the second enhanced audio data comprises:

performing frequency-domain conversion on the audio data to obtain frequency-domain audio data;

performing the frequency-domain conversion on the first channel encoding parameter and the second channel encoding parameter respectively to obtain a first channel frequency-domain encoding parameter and a second channel frequency-domain encoding parameter;

multiplying the first channel frequency-domain encoding parameter by the frequency-domain audio data to obtain first enhanced frequency-domain audio data;

multiplying the second channel frequency-domain encoding parameter by the frequency-domain audio data to obtain second enhanced frequency-domain audio data; and the generating the enhanced audio data comprises:
determining the enhanced audio data according to the first enhanced frequency-domain audio data and the second enhanced frequency-domain audio data.

8. The method according to claim 7, wherein the determining the enhanced audio data according to the first enhanced frequency-domain audio data and the second enhanced frequency-domain audio data comprises:
performing time-domain conversion on the first enhanced frequency-domain audio data to obtain the first enhanced audio data;
performing time-domain conversion on the second enhanced frequency-domain audio data to obtain the second enhanced audio data; and
determining audio data formed by the first enhanced audio data and the second enhanced audio data as the enhanced audio data.

9. The method according to claim 6, wherein the method further comprises:
storing the video frame data in association with the enhanced audio data in a cache server;
acquiring the video frame data and the enhanced audio data from the cache server in response to a video playback operation for the video; and
outputting the video frame data and the enhanced audio data.

10. The method according to claim 9, wherein the outputting comprises:
outputting the video frame data;
outputting the first enhanced audio data through a first sound output channel of a user terminal; and
outputting the second enhanced audio data through a second sound output channel of the user terminal.

11. The method according to claim 1, wherein
the determining comprises:
inputting the video frame data to an object identification model, and receiving a target object category of the target object and the position attribute information of the target object in the video as output of the object identification model; and
the method further comprises:
inputting the audio data to an audio identification model, and determining, through the audio identification model, a sound-emitting object category to which the audio data belongs;
matching the target object category with the sound-emitting object category to obtain a matching result; and
in response to the matching result indicating that the target object category matches the sound-emitting object category, performing the acquiring the set of channel encoding parameters associated with the position attribute information, and performing the azimuth enhancement processing on the audio data to obtain the enhanced audio data.

12. A data processing apparatus, comprising:
processing circuitry configured to:
acquire video frame data including one or more video frames and audio data of a video;
determine position attribute information of a target object in the acquired one or more video frames, the target object being associated with the audio data; and acquire, from a parameter mapping table that stores a mapping relationship between predefined channel encoding parameters associated with ear positions of a user and relative positions of the target object with respect to the ear positions of the user, a set of channel encoding parameters including a first channel encoding parameter associated with a first one of the ear positions of the user and a second channel encoding parameter associated with a second one of the ear positions of the user for different audio channels corresponding to the position attribute information;
perform azimuth enhancement processing on the audio data based on the set of channel encoding parameters, the azimuth enhancement processing comprising:
processing the audio data based on the first channel encoding parameter to obtain first enhanced audio data;
processing the audio data based on the second channel encoding parameter to obtain second enhanced audio data; and
generating enhanced audio data from the first enhanced audio data and the second enhanced audio data, the first enhanced audio data being louder than the second enhanced audio data to the user based on the position attribute information of the target object indicating that the target object is closer to the first one of the ear positions of the user than the second one of the ear positions of the user.

13. The apparatus according to claim 12, wherein the processing circuitry is further configured to:
acquire the video, input the video to a video decapsulation component, and decapsulate the video through the video decapsulation component to obtain video stream data and audio stream data; and
decode the video stream data and the audio stream data respectively in the video decapsulation component to obtain the video frame data and the audio data.

14. The apparatus according to claim 12, wherein the target object is an object in a rest state; and
the processing circuitry is further configured to:
input the video frame data to an object identification model, and acquire N continuous video frames from the object identification model, the N continuous video frames being video frames with continuous timestamps, each of the N continuous video frames comprising the target object, N being a positive integer less than or equal to M, M being a total quantity of video frames in the video frame data, M being an integer greater than 1;
identify, in the N continuous video frames, video frames in which a sound emitting part of the target object changes, and set the video frames in which the sound emitting part of the target object changes as changed video frames;
determine a position coordinate of the target object in the changed video frames; and
determine the position attribute information of the target object in the video according to the position coordinate.

15. The apparatus according to claim 12, wherein the target object is an object in a motion state; and
the processing circuitry is further configured to:

input the video frame data to an object identification model, and identify a background image in the video frame data through the object identification model;

acquire a background pixel value of the background image, and acquire a video frame pixel value corresponding to the video frame data;

determine a difference pixel value between the background pixel value and the video frame pixel value, and determine a region in the one or more video frames where the difference pixel value is located as a position coordinate of the target object; and determine the position attribute information of the target object in the video according to the position coordinate.

16. The apparatus according to claim 14, wherein the processing circuitry is further configured to:

acquire central position information of a virtual camera, the virtual camera simulating shooting of the target object;

determine a depth of field distance between the target object and the central position information according to the position coordinate;

determine a position offset angle between the target object and the virtual camera; and determine the depth of field distance and the position offset angle as the position attribute information of the target object.

17. The apparatus according to claim 12, wherein the processing circuitry is further configured to:

perform convolution processing on the audio data according to the first channel encoding parameter to obtain the first enhanced audio data; and perform the convolution processing on the audio data according to the second channel encoding parameter to obtain the second enhanced audio data.

18. A non-transitory computer-readable storage medium storing computer-readable instructions thereon, which, when executed by a computer, cause the computer to perform a data processing method comprising:

acquiring video frame data including one or more video frames and audio data of a video;

determining position attribute information of a target object in the acquired one or more video frames, the target object being associated with the audio data; and acquiring, from a parameter mapping table that stores a mapping relationship between predefined channel encoding parameters associated with ear positions of a user and relative positions of the target object with respect to the ear positions of the user, a set of channel encoding parameters including a first channel encoding parameter associated with a first one of the ear positions of the user and a second channel encoding parameter associated with a second one of the ear positions of the user for different audio channels corresponding to the position attribute information;

performing azimuth enhancement processing on the audio data based on the set of channel encoding parameters, the azimuth enhancement processing comprising:

processing the audio data based on the first channel encoding parameter to obtain first enhanced audio data;

processing the audio data based on the second channel encoding parameter to obtain second enhanced audio data; and generating enhanced audio data from the first enhanced audio data and the second enhanced audio data, the first enhanced audio data being louder than the second enhanced audio data to the user based on the position attribute information of the target object indicating that the target object is closer to the first one of the ear positions of the user than the second one of the ear positions of the user.

* * * * *